United States Patent
Sato

(10) Patent No.: US 9,445,111 B2
(45) Date of Patent: Sep. 13, 2016

(54) IMAGE PROCESSING APPARATUS AND IMAGE PROCESSING METHOD

(71) Applicant: Sony Corporation, Tokyo (JP)

(72) Inventor: Kazushi Sato, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/490,422

(22) Filed: Sep. 18, 2014

(65) Prior Publication Data

US 2015/0195523 A1 Jul. 9, 2015

(30) Foreign Application Priority Data

Jan. 8, 2014 (JP) ................................. 2014-001992
May 26, 2014 (JP) ................................. 2014-108269

(51) Int. Cl.
| | |
|---|---|
| H04N 19/36 | (2014.01) |
| H04N 19/70 | (2014.01) |
| H04N 19/463 | (2014.01) |
| H04N 19/59 | (2014.01) |

(52) U.S. Cl.
CPC ............ *H04N 19/36* (2014.11); *H04N 19/463* (2014.11); *H04N 19/59* (2014.11); *H04N 19/70* (2014.11)

(58) Field of Classification Search
None
See application file for complete search history.

(56) References Cited

U.S. PATENT DOCUMENTS

| | | | | |
|---|---|---|---|---|
| 5,412,428 A | * | 5/1995 | Tahara ..................... | H04N 7/54 375/240.25 |
| 5,874,928 A | * | 2/1999 | Kou ....................... | G06F 3/1475 345/1.1 |
| 6,269,217 B1 | * | 7/2001 | Rodriguez ............. | H04N 9/045 348/E9.01 |
| 6,567,543 B1 | * | 5/2003 | Shiraiwa et al. ............. | 382/167 |
| 2008/0018962 A1 | * | 1/2008 | Kawai ........................... | 358/522 |
| 2009/0097558 A1 | * | 4/2009 | Ye et al. ................... | 375/240.13 |
| 2009/0110073 A1 | * | 4/2009 | Wu et al. .................. | 375/240.15 |
| 2010/0260260 A1 | * | 10/2010 | Wiegand et al. ......... | 375/240.12 |
| 2013/0083846 A1 | * | 4/2013 | Kumakura ............... | 375/240.08 |
| 2015/0103902 A1 | * | 4/2015 | Li .......................... | H04N 19/30 375/240.12 |

FOREIGN PATENT DOCUMENTS

JP 2010-532936 10/2010

OTHER PUBLICATIONS

Bross et al., "High Efficiency Video Coding (HEVC) text specification draft 10 (for FDIS & Consent)", Joint Collaborative Team on Video Coding, JCTVC-L1003_v4, Jan. 14-23, 2013, 324 pp.

Chen et al., "Description of scalable video coding technology proposal by Qualcomm (configuration 2)", Joint Collaborative Team on Video Coding, JCTVC-K0036, Oct. 10-19, 2012, 21 pp.

(Continued)

*Primary Examiner* — Sath V Perungavoor
*Assistant Examiner* — Peter D Le
(74) *Attorney, Agent, or Firm* — Oblon, McClelland, Maier & Neustadt, L.L.P.

(57) ABSTRACT

There is provided an image processing apparatus including circuitry configured to predict an image of a second layer from an image of a first layer using a lookup table which maps combinations of a luminance component, a first color difference component, and a second color difference component of the first layer to predicted pixel values of the second layer corresponding to the combinations. The second layer has a different color gamut from the first layer. The circuitry uses the lookup table in which granularities of the first and second color difference components are lower than a granularity of the luminance component.

15 Claims, 23 Drawing Sheets

(56) References Cited

OTHER PUBLICATIONS

Bordes et al., "SCE4: Results on 5.3-test1 and 5.3-test2,"Joint Collaborative Team on Video Coding, JCTVC-O0159, Oct. 23-Nov. 1, 2013, 19 pp.

He et al., "Non-SCE4/AHG14: Combined bit-depth and color gamut conversion with 3D LUT for SHVC color gamut scalability," Joint Collaborative Team on Video Coding, Oct. 23-Nov. 1, 2013, 16 pp.

International Search Report issued Feb. 3, 2015, in PCT/JP20154/079623.

Li et al., "Non-SCE1: Asymmetric 3D LUT for Color Gamut Scalability," Joint Collaborative Team on Video Coding, JCTVC-P0063, 16$^{th}$ Meeting, Jan. 9-17, 2015, San Jose, USA, 8 pps.

Bordes et al., "AHG14: Color Gamut Scalable Video Coding using 3D LUT," Joint Collaborative Team on Video Coding, JCTVC-M0197-r2, 13$^{th}$ Meeting, Apr. 18-26, 2013, Incheon, KR, 10 pps.

\* cited by examiner

FIG.20
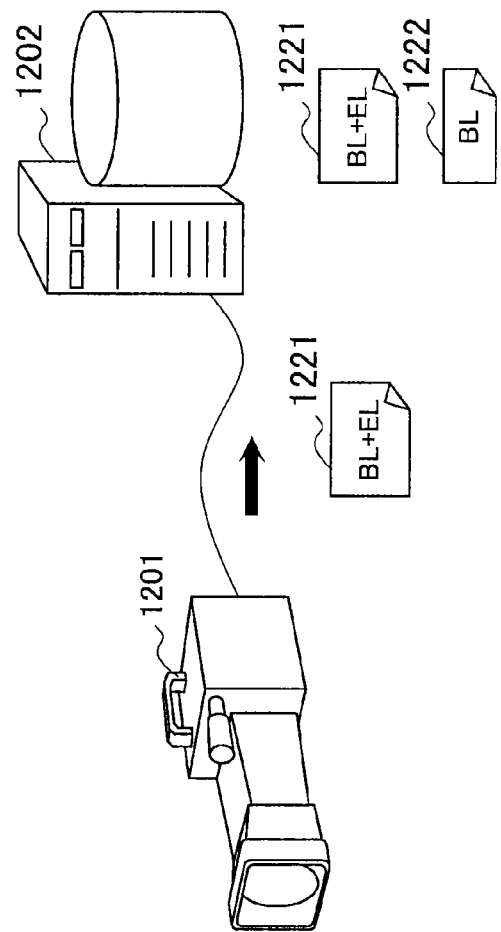
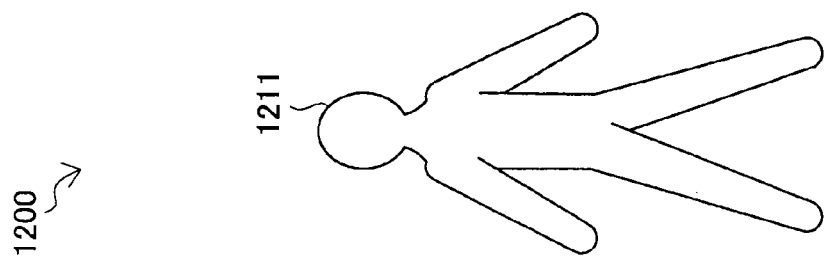

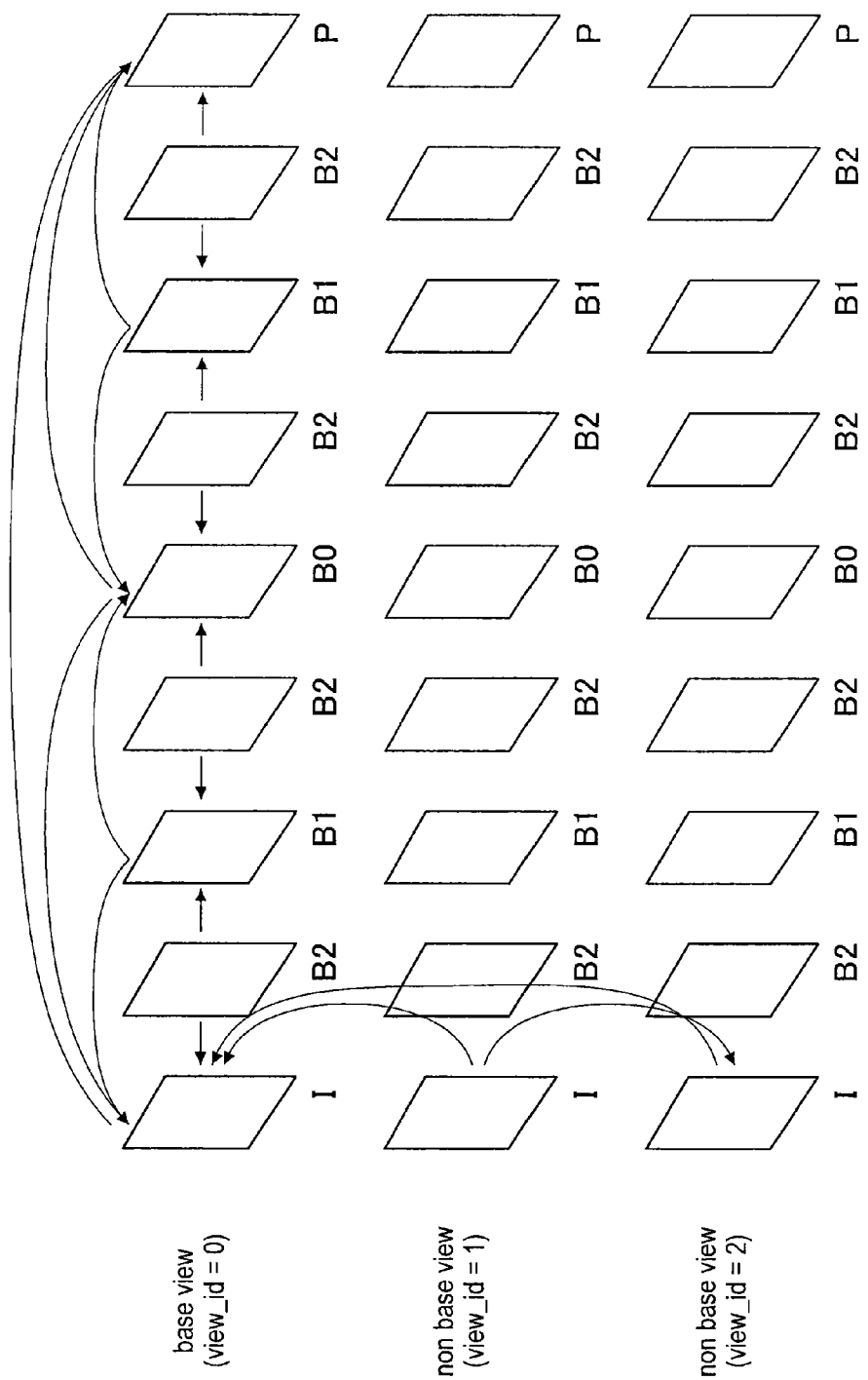

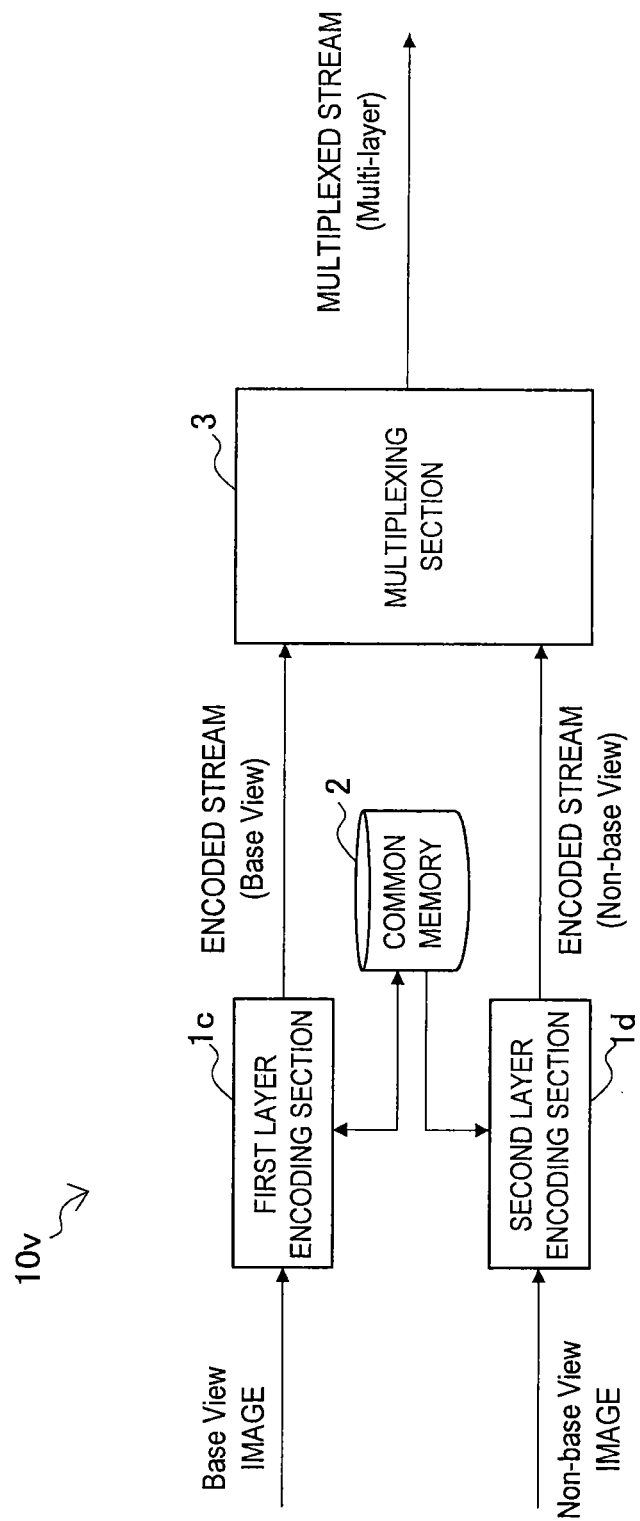

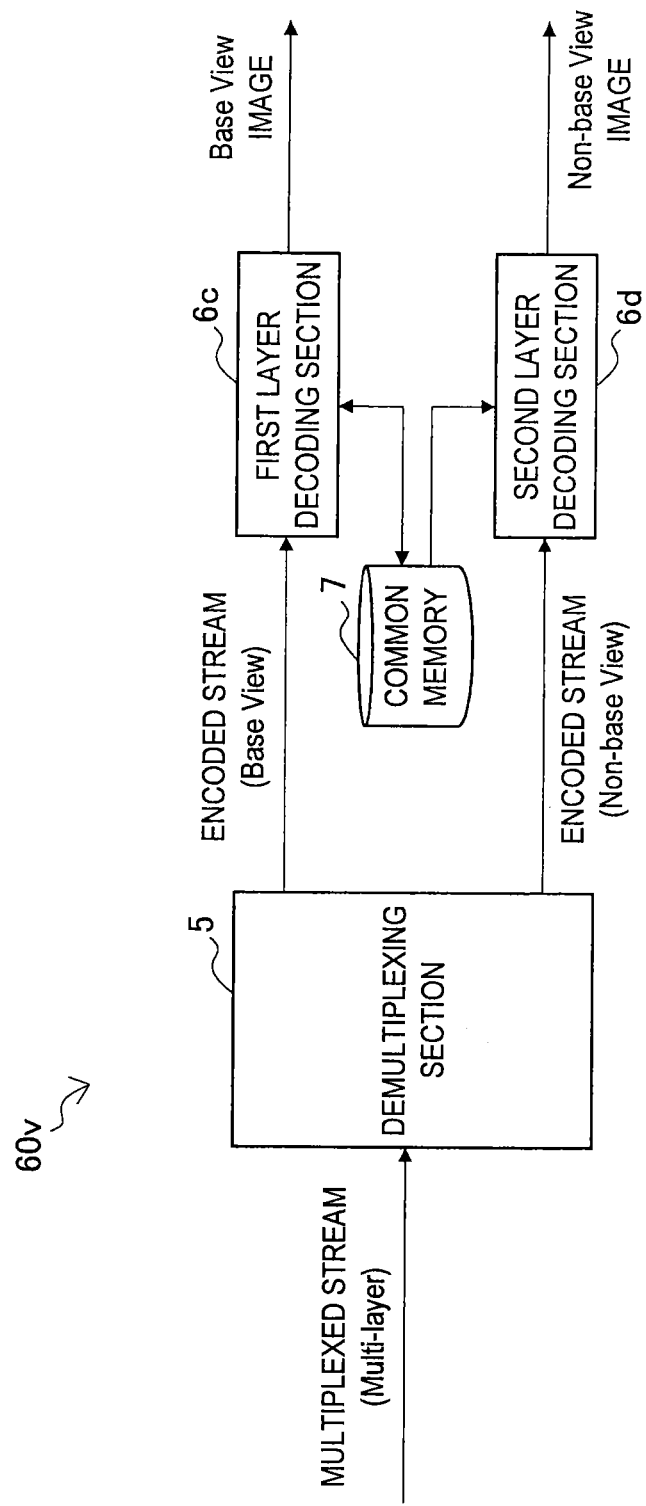

IMAGE PROCESSING APPARATUS AND IMAGE PROCESSING METHOD

CROSS REFERENCE TO RELATED APPLICATIONS

This application claims the benefit of Japanese Priority Patent Applications JP 2014-001992 filed Jan. 8, 2014 and JP 2014-108269 filed May 26, 2014, the entire contents of which are incorporated herein by reference.

BACKGROUND

The present disclosure relates to an image processing apparatus and an image processing method.

The standardization of an image coding scheme called HEVC (High Efficiency Video Coding) by JCTVC (Joint Collaboration Team-Video Coding), which is a joint standardization organization of ITU-T and ISO/IEC, is currently under way for the purpose of improving coding efficiency more than H.264/AVC (see, for example, "High Efficiency Video Coding (HEVC) text specification draft 10 (for FDIS & Consent)" by Benjamin Bross, Woo-Jin Han, Gary J. Sullivan, Jens-Rainer Ohm, Gary J. Sullivan, Ye-Kui Wang, and Thomas Wiegand, (JCTVC-L1003 v 4, Jan. 14 to 23, 2013).

HEVC provides not only coding of a single layer but also scalable video coding, as in known image coding schemes such as MPEG2 and AVC (Advanced Video Coding). An HEVC scalable video coding technology is also called SHVC (Scalable HEVC) (for example, see "Description of scalable video coding technology proposal by Qualcomm (configuration 2)" by Jianle Chen, el. al, (JCTVC-K0036, Oct. 10 to 19, 2012).

Incidentally, scalable video coding is generally a technology that hierarchically encodes a layer transmitting a rough image signal and a layer transmitting a fine image signal. Typical attributes hierarchized in the scalable video coding mainly include the following three:

Space scalability: Spatial resolutions or image sizes are hierarchized.

Time scalability: Frame rates are hierarchized.

SNR (Signal to Noise Ratio) scalability: SN ratios are hierarchized.

Further, though not yet adopted in the standard, the bit depth scalability and chroma format scalability are also discussed.

In "SCE4: Results on 5.3-test1 and 5.3-test2" by Philippe Bordes, et al., (JCTVC-O0159, Oct. 23 to Nov. 1, 2013) and "Non-SCE4/AHG14: Combined bit-depth and color gamut conversion with 3D LUT for SHVC color gamut scalability" by Yuwen He, et al., (JCTVC-O0161, Oct. 23 to Nov. 1, 2013), color gamut scalability in which color gamuts were hierarchized was proposed. For example, in high definition (HD) televisions, an image size of 1920×1080 pixels, a color gamut of ITU-R BT.709, and a bit depth of 8 bits are generally used. On the other hand, in ultra high definition (UHD) televisions, use of an image size of 4000×2000 pixels or 8000×4000 pixels, a color gamut of ITU-R BT.2020, and a bit depth of 10 or 12 bits is being investigated. According to methods described in "SCE4: Results on 5.3-test1 and 5.3-test2" by Philippe Bordes, et al., (JCTVC-O0159, Oct. 23 to Nov. 1, 2013) and "Non-SCE4/AHG14: Combined bit-depth and color gamut conversion with 3D LUT for SHVC color gamut scalability" by Yuwen He, et al., (JCTVC-O0161, Oct. 23 to Nov. 1, 2013), corresponding pixel vectors in the color gamut of BT.2020 are predicted using a 3-dimensional lookup table from pixel vectors (Y, U, V) in the color gamut of BT.709.

SUMMARY

In general, the bit depths of three color components are mutually the same in the same layer. Therefore, when pixel values are selected (graded) to refer to a lookup table, a granularity is commonly designed for three color components. For example, in "SCE4: Results on 5.3-test1 and 5.3-test2" by Philippe Bordes, et al., (JCTVC-O0159, Oct. 23 to Nov. 1, 2013) it is assumed that the granularities of three color components in a lookup table for color gamut prediction are defined by one parameter nbp_code encoded in a Picture Parameter Set (PPS). In "Non-SCE4/AHG14: Combined bit-depth and color gamut conversion with 3D LUT for SHVC color gamut scalability" by Yuwen He, et al., (JCTVC-O0161, Oct. 23 to Nov. 1, 2013), the size of a lookup table (granularities of three color components) is set to be 17×17×17. As the grading is finer, prediction precision of the color gamut prediction is higher, but the size (LUT size) of the lookup table is larger. For example, when the bit depth of predicted pixel values is 10 bits and the LUT size is 17×17×17, a buffer of 17×17×17×3 (the number of color components)×10 (bit depth)=147390 bits has to be ensured in order to buffer the lookup table. In consideration of the fact that a buffer size necessary for a general quantization matrix (scaling list) of HEVC is about 8000 bits, the buffer size of the lookup table for the color gamut prediction is understood to be extremely large.

Accordingly, it is desirable to provide a method of reducing a buffer size of a lookup table while ensuring sufficient prediction precision in color gamut scalability.

According to an embodiment of the present disclosure, there is provided an image processing apparatus including circuitry configured to predict an image of a second layer from an image of a first layer using a lookup table which maps combinations of a luminance component, a first color difference component, and a second color difference component of the first layer to predicted pixel values of the second layer corresponding to the combinations. The second layer has a different color gamut from the first layer. The circuitry uses the lookup table in which granularities of the first and second color difference components are lower than a granularity of the luminance component.

According to an embodiment of the present disclosure, there is provided an image processing method including predicting, by circuitry of an image processing apparatus, an image of a second layer from an image of a first layer using a lookup table which maps combinations of a luminance component, a first color difference component, and a second color difference component of the first layer to predicted pixel values of the second layer corresponding to the combinations. The second layer has a different color gamut from the first layer. The predicting of the image of the second layer is performed by the circuitry using the lookup table in which granularities of the first and second color difference components are lower than a granularity of the luminance component.

According to an embodiment of the present disclosure, there is provided a non-transitory computer-readable medium having stored thereon: encoded image data of a first layer, encoded image data of a second layer, and a lookup table which maps combinations of a luminance component, a first color difference component, and a second color difference component of the first layer to predicted pixel values of the second layer corresponding to the combinations. The second layer has a different color gamut from the first layer. A decoder predicts an image of the second layer from an image of the first layer using the lookup table. In the lookup table, granularities of the first and second color difference components are lower than a granularity of the luminance component.

According to an embodiment of the present disclosure, there is provided an encoder including circuitry configured to encode an image of a first layer, encode an image of a second layer, and generate a lookup table which maps combinations of a luminance component, a first color difference component, and a second color difference component of the first layer to predicted pixel values of the second layer corresponding to the combinations. The second layer has a different color gamut from the first layer. In the lookup table, granularities of the first and second color difference components are lower than a granularity of the luminance component.

According to the technology in the present disclosure, it is possible to reduce a buffer size of a lookup table while ensuring sufficient prediction precision in color gamut scalability.

BRIEF DESCRIPTION OF THE DRAWINGS

FIG. 20 is an explanatory view illustrating a third example of use of the scalable video coding.

FIG. 21 is an explanatory view illustrating a multi-view codec.

FIG. 22 is a block diagram showing a schematic configuration of the image encoding device for multi-view codec.

FIG. 23 is a block diagram showing a schematic configuration of the image decoding device for multi-view codec.

DETAILED DESCRIPTION OF THE EMBODIMENT(S)

Hereinafter, preferred embodiments of the present invention will be described in detail with reference to the appended drawings. Note that, in this specification and the drawings, elements that have substantially the same function and structure are denoted with the same reference signs, and repeated explanation is omitted.

The description will be made in the following order.
1. Overview
  1-1. Scalable Video Coding
  1-2. Color Gamut Scalability
  1-3. Basic Configuration Example of Encoder
  1-4. Basic Configuration Example of Decoder
2. Configuration Example of EL Encoding Section in an Embodiment
  2-1. Overall Configuration
  2-2. Details of Color Gamut Prediction
3. Process Flow for Encoding According to an Embodiment
  3-1. Schematic Flow
  3-2. Color Gamut Prediction Process
4. Configuration Example of EL Decoding Section in an Embodiment
  4-1. Overall Configuration
  4-2. Details of Color Gamut Prediction
5. Process Flow for Decoding According to an Embodiment
  5-1. Schematic Flow
  5-2. Color Gamut Prediction Process
6. Dynamic Range Scalability
7. Example Application
  7-1. Application to Various Products
  7-2. Various Uses of Scalable Video Coding
  7-3. Others
8. Conclusion

1. OVERVIEW 1-1. Scalable Video Coding

In the scalable video coding, a plurality of layers, each containing a series of images, is encoded. A base layer is a layer encoded first to represent roughest images. An encoded stream of the base layer may be independently decoded without decoding encoded streams of other layers. Layers other than the base layer are layers called enhancement layer representing finer images. Encoded streams of enhancement layers are encoded by using information contained in the encoded stream of the base layer. Therefore, to reproduce an image of an enhancement layer, encoded streams of both of the base layer and the enhancement layer are decoded. The number of layers handled in the scalable video coding may be any number equal to 2 or greater. When three layers or more are encoded, the lowest layer is the base layer and the remaining layers are enhancement layers. For an encoded stream of a higher enhancement layer, information contained in encoded streams of a lower enhancement layer and the base layer may be used for encoding and decoding.

Figure 1:
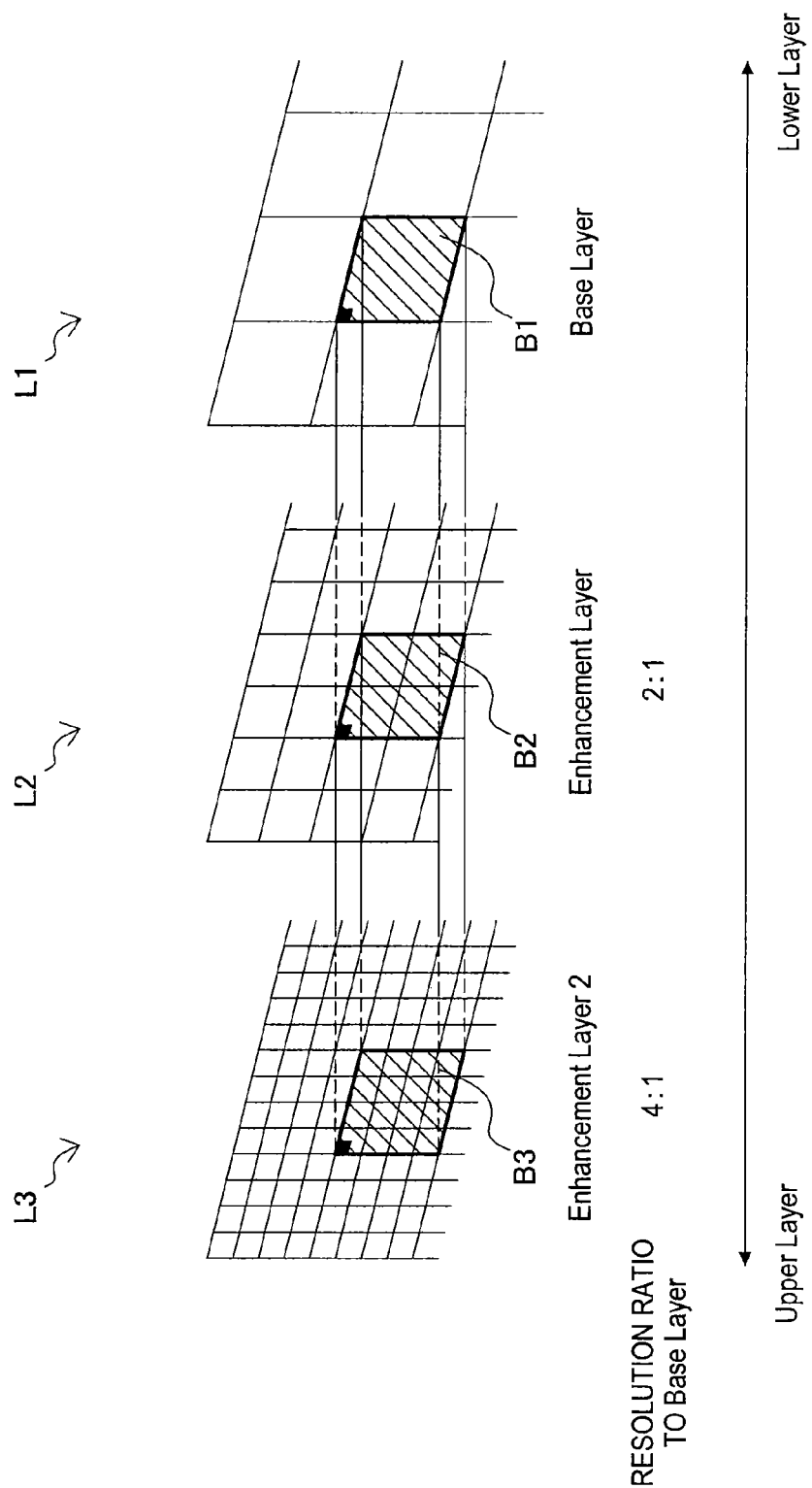
FIG. 1 is an explanatory view illustrating scalable video coding.

FIG. 1 shows three layers L1, L2, and L3 subjected to scalable video coding. The layer L1 is a base layer and the layers L2 and L3 are enhancement layers. A space resolution ratio of the layer L2 to the layer L1 is 2:1 and a space resolution ratio of the layer L3 to the layer L1 is 4:1. The resolution ratios herein are merely examples. For example, a resolution ratio of a non-integer such as 1.5:1 may be used. A block B1 of the layer L1 is a processing unit of an encoding process in a picture of the base layer. A block B2 of the layer L2 is a processing unit of an encoding process in a picture of the enhancement layer to which a common scene to the block B1 is projected. The block B2 corresponds to the block B1 of the layer L1. A block B3 of the layer L3 is a processing unit of an encoding process in a picture of the enhancement layer higher than the layers to which the common scene to the blocks B1 and B2 is projected. The block B3 corresponds to the block B1 of the layer L1 and the block B2 of the layer L2.

1-2. Color Gamut Scalability

In the layer structure exemplified in FIG. 1, textures of images are similar between the layers to which the common scene is projected. That is, the textures of the block B1 in the layer L1, the block B2 in the layer L2, and the block B3 in the layer L3 are similar. Accordingly, for example, when pixels of the block B2 or B3 are predicted using the block B1 as a reference block or pixels of the block B3 are predicted using the block B2 as a reference block, there is a probability of high prediction precision being obtained. Such prediction between the layers is referred to as inter layer prediction. Non-Patent Literature 2 proposes several methods for the inter layer prediction. In the methods, a decoded image (reconstructed image) of a base layer is used as a reference image to predict a decoded image of an enhancement layer in intra BL prediction. In intra residual prediction and inter residual prediction, a prediction error (residual) image of the base layer is used as a reference image to predict a prediction error image of an enhancement layer.

Figure 2:
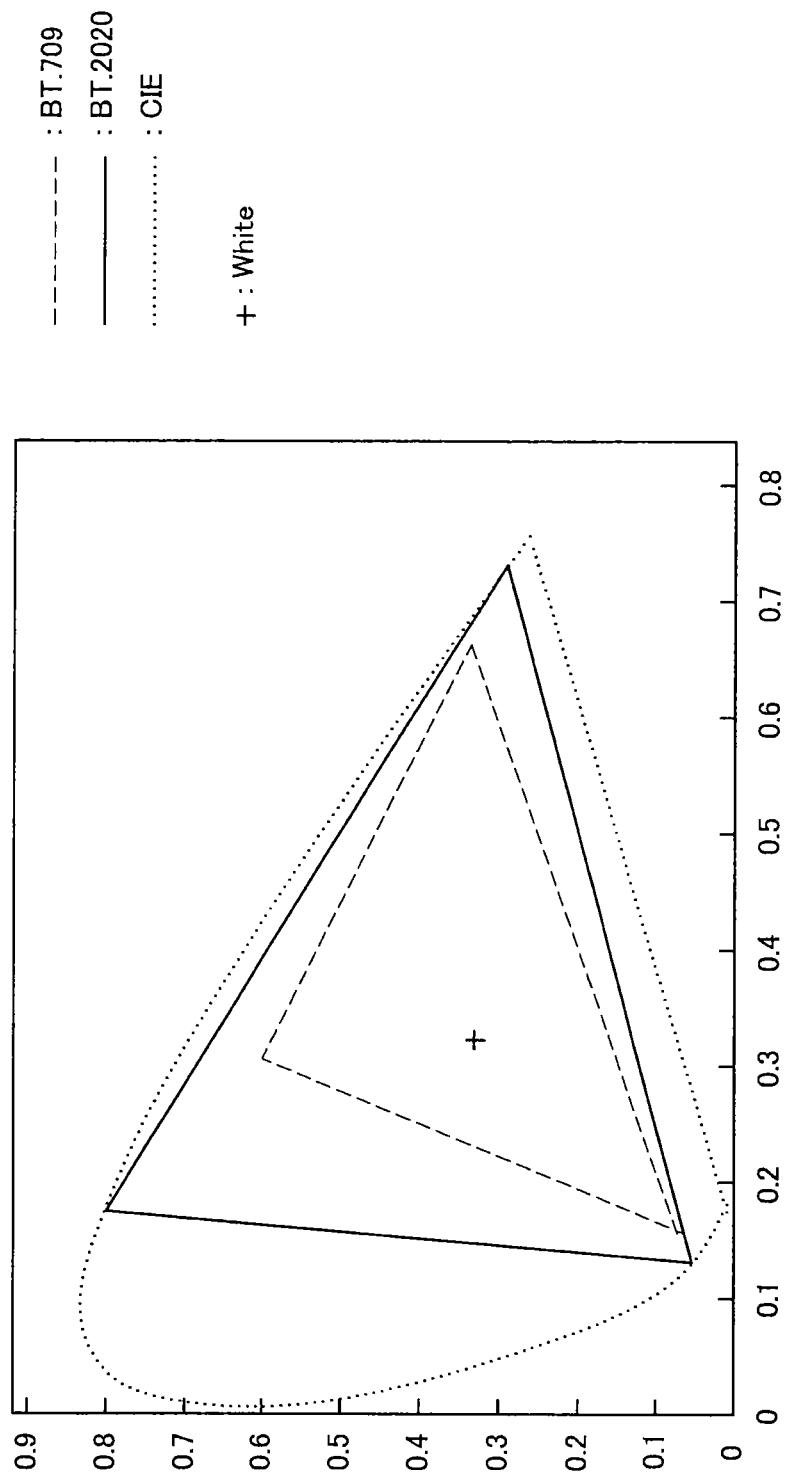
FIG. 2 is an explanatory view illustrating color gamuts expressed by BT.709 and BT.2020.

Here, for example, an image of the layer L1 is assumed to be an HD television image and an image of the layer L2 is assumed to be a UHD television image. FIG. 2 is an explanatory view illustrating color gamuts expressed by BT.709 and BT.2020. Referring to FIG. 2, a color gamut graph in which a 3-dimensional color space is mapped to a 2-dimensional plane using a predetermined restraint condition is shown. The cross mark in the graph indicates a position to which white is mapped. A dashed line in the graph indicates a color range expressed by BT.709. A solid line in the graph indicates a color range expressed by BT.2020. A dotted line in the graph indicates a color range which can be identified by human sight. As understood from FIG. 2, BT.2020 can express a greater variety of colors than BT.709. When each pixel of the layer L1 is expressed by BT.709 and each pixel of the layer L2 is expressed by BT.2020, resolution conversion (that is, up-sampling) or color gamut conversion is performed on the reference image (the image of the Layer 1) at the time of the inter layer prediction. For example, in "SCE4: Results on 5.3-test1 and 5.3-test2" by Philippe Bordes, et al., (JCTVC-O0159, Oct. 23 to Nov. 1, 2013) and "Non-SCE4/AHG14: Combined bit-depth and color gamut conversion with 3D LUT for SHVC color gamut scalability" by Yuwen He, et al., (JCTVC-O0161, Oct. 23 to Nov. 1, 2013), the methods of converting pixel vectors of BT.709 into pixel vectors of BT.2020 using a 3-dimensional lookup table are described. In practice, the pixel vector after the conversion is not used without change, but a residual error (predicted error) can be separately encoded and decoded. Therefore, such color gamut conversion is referred to as color gamut prediction. A lookup table maps combinations of a luminance component (Y), a first color difference component (U), and a second color difference component (V) of the layer L1 to predicted pixel values of the layer L2 corresponding to the combinations.

Incidentally, in general, the bit depths of three color components in the same layer are mutually the same. When the bit depth is n bits, both of the range widths of the luminance component and the color difference component are equal to $2^n$. Therefore, when pixel values are selected (graded) to refer to a lookup table, a granularity is commonly designed for three color components. For example, in "SCE4: Results on 5.3-test1 and 5.3-test2" by Philippe Bordes, et al., (JCTVC-O0159, Oct. 23 to Nov. 1, 2013), it is assumed that granularities of three color components in a lookup table for color gamut prediction are defined by one parameter nbp_code encoded in a PPS, as shown in the following Table 1.

TABLE 1

SYNTAX FOR COLOR GAMUT SCALABILITY
(EXTRACTED FROM JCTVC-O0159)

```
pic_parameter_set_rbsp( ) {
    ...
    use_color_prediction_flag
    if ( use_color_prediction_flag )
        3D_LUT_color_data( )
    ...
}
3D_LUT_color_data( ) {
    nbp_code
    lut_bit_depth_minus8
    coding_octant(0, 0, 0, 0)
}
```

In Table 1, a flag use_color_prediction_flag is a flag that indicates whether a color gamut is converted between layers. A function 3D_LUT_color_data( ) defines a syntax associated with a lookup table for color gamut prediction. A parameter nbp_code commonly defines the granularities of three color components in the lookup table for the color gamut prediction. An actual relation between the granularity nbp and the parameter nbp_code is expressed by a relation equation nbp=1+(1<<(nbp_code-1)). A parameter lut_bit_depth_minus8 defines a bit depth of a predicted pixel value. A function coding_octant (0,0,0,0) is a function that defines content (mapping between input pixel values and predicted pixel values) of the lookup table by the granularities specified by the parameter nbp_code. The specific specification of the function coding_octant (0,0,0,0) is described in "SCE4: Results on 5.3-test1 and 5.3-test2" by Philippe Bordes, et al., (JCTVC-O0159, Oct. 23 to Nov. 1, 2013). In "Non-SCE4/AHG14: Combined bit-depth and color gamut conversion with 3D LUT for SHVC color gamut scalability" by Yuwen He, et al., (JCTVC-O0161, Oct. 23 to Nov. 1, 2013), a lookup table with a size of 17×17×17 is used in all tests when the performance of color gamut prediction is simulated using the lookup table.

As the granularities of the color components in the lookup table for the color gamut prediction are finer, higher prediction precision of the color gamut prediction can be expected. On the other hand, as the granularities are finer, the size (LUT size) of the lookup table is larger. For example, when the bit depth of the predicted pixel values is 10 bits and the LUT size is 17×17×17, a buffer of 17×17×17×3 (the number of color components)×10 (bit depth)=147390 bits has to be ensured in order to buffer the lookup table. In consideration of the fact that a buffer size necessary for a general quantization matrix (scaling list) of HEVC is about 8000 bits, the buffer size of the lookup table for the color gamut prediction is understood to be extremely large. When a large capacity of buffer is ensured, there may be various disadvantages such as an increase in device cost, an operation failure caused due to memory resource shortage, and process delay. Accordingly, in an embodiment to be described below, a structure configured to reduce a buffer size of a lookup table while ensuring sufficient prediction precision in color gamut scalability will be described.

1-3. Basic Configuration Example of Encoder

Figure 3:
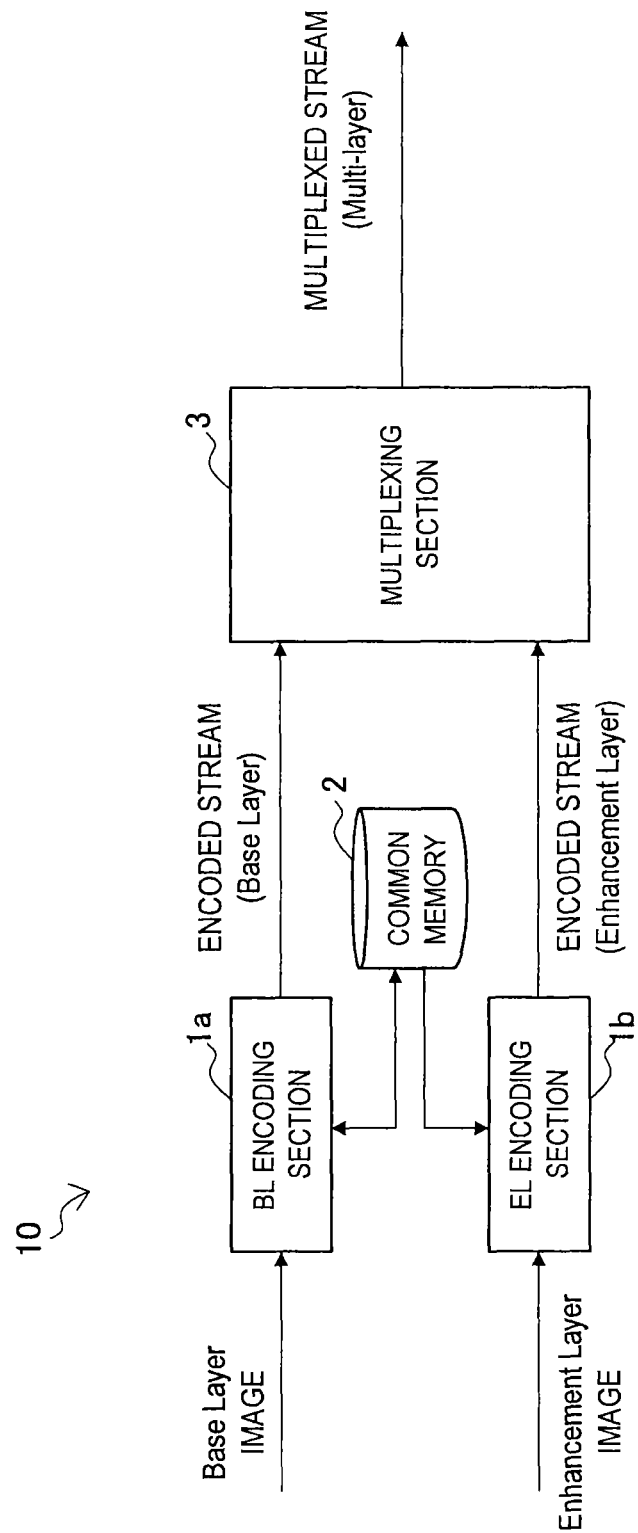
FIG. 3 is a block diagram showing a schematic configuration of an image encoding device according to an embodiment.

FIG. 3 is a block diagram showing a schematic configuration of an image encoding device 10 according to an embodiment supporting scalable video coding. Referring to FIG. 3, the image encoding device 10 includes a base layer (BL) encoding section 1a, an enhancement layer (EL) encoding section 1b, a common memory 2, and a multiplexing section 3.

The BL encoding section 1a encodes a base layer image to generate an encoded stream of the base layer. The EL encoding section 1b encodes an enhancement layer image to generate an encoded stream of an enhancement layer. The common memory 2 stores information commonly used between layers. The multiplexing section 3 multiplexes an encoded stream of the base layer generated by the BL encoding section 1a and an encoded stream of at least one enhancement layer generated by the EL encoding section 1b to generate a multilayer multiplexed stream.

1-4. Basic Configuration Example of Decoder

Figure 4:
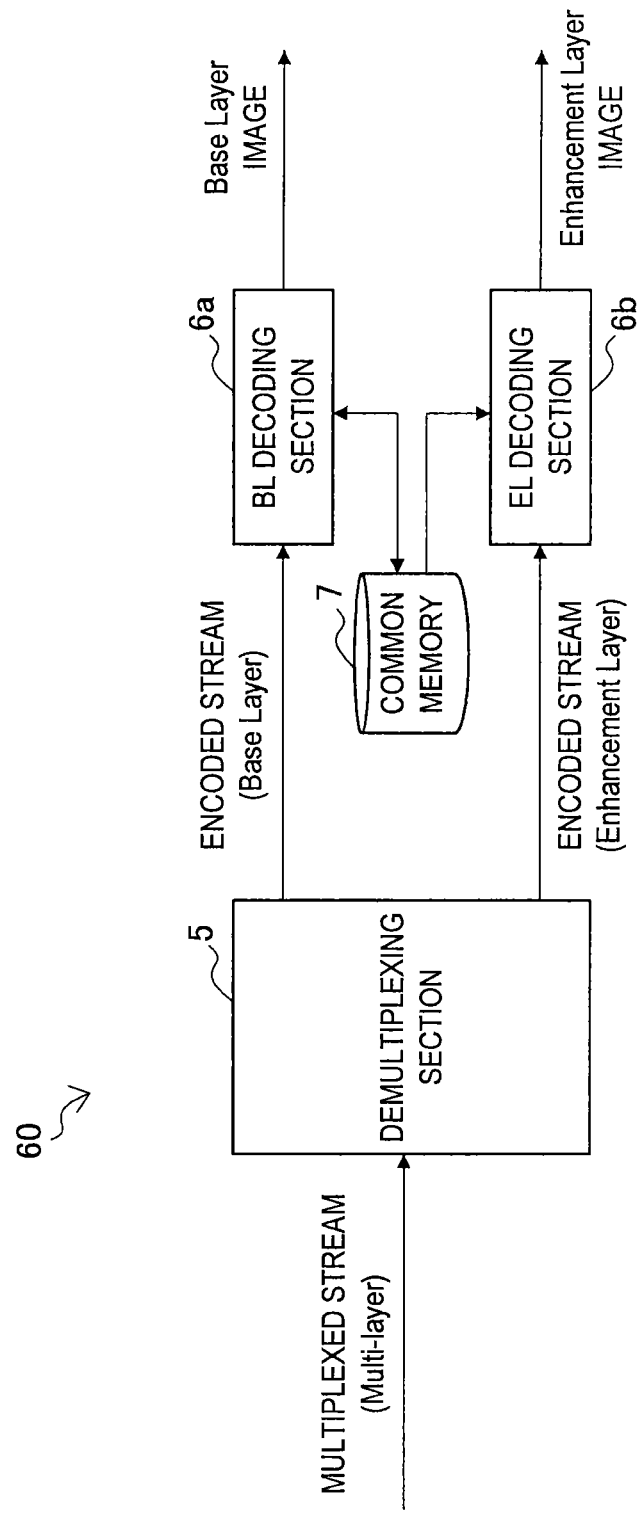
FIG. 4 is a block diagram showing a schematic configuration of an image decoding device according to an embodiment.

FIG. 4 is a block diagram showing a schematic configuration of an image decoding device 60 according to an embodiment supporting scalable video coding. Referring to FIG. 4, the image decoding device 60 includes a demultiplexing section 5, a base layer (BL) decoding section 6a, an enhancement layer (EL) decoding section 6b, and a common memory 7.

The demultiplexing section 5 demultiplexes a multilayer multiplexed stream into an encoded stream of the base layer and an encoded stream of at least one enhancement layer. The BL decoding section 6a decodes a base layer image from an encoded stream of the base layer. The EL decoding section 6b decodes an enhancement layer image from an encoded stream of an enhancement layer. The common memory 7 stores information commonly used between layers.

In the image encoding device 10 illustrated in FIG. 3, the configuration of the BL encoding section 1a to encode the base layer and that of the EL encoding section 1b to encode an enhancement layer are similar to each other. Some parameters and images generated or acquired by the BL encoding section 1a may be buffered by using the common memory 2 and reused by the EL encoding section 1b. In the next section, such a configuration of the EL encoding section 1b will be described in detail.

Similarly, in the image decoding device 60 illustrated in FIG. 4, the configuration of the BL decoding section 6a to decode the base layer and that of the EL decoding section 6b to decode an enhancement layer are similar to each other. Some parameters and images generated or acquired by the BL decoding section 6a may be buffered by using the common memory 7 and reused by the EL decoding section 6b. Further in the next section, such a configuration of the EL decoding section 6b will be described in detail.

Figure 5:
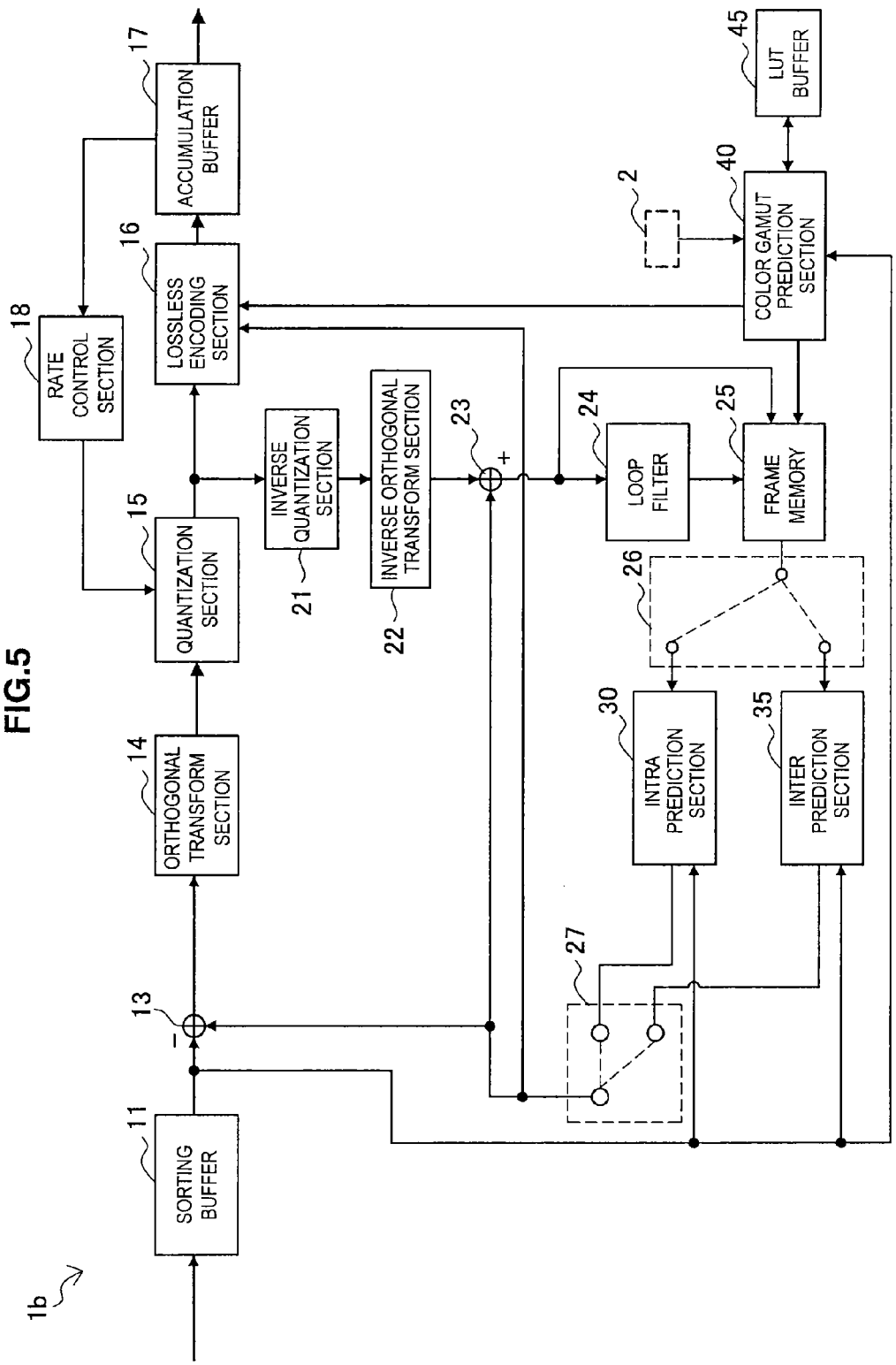
FIG. 5 is a block diagram showing an example of the configuration of an EL encoding section shown in FIG. 3.

2. CONFIGURATION EXAMPLE OF EL ENCODING SECTION IN AN EMBODIMENT 2-1. Overall Configuration FIG. 5 is a block diagram showing an example of the configuration of the EL encoding section 1b illustrated in FIG. 3. Referring to FIG. 5, the EL encoding section 1b includes a sorting buffer 11, a subtraction section 13, an orthogonal transform section 14, a quantization section 15, a lossless encoding section 16, an accumulation buffer 17, a rate control section 18, an inverse quantization section 21, an inverse orthogonal transform section 22, an addition section 23, a loop filter 24, a frame memory 25, selectors 26 and 27, an intra prediction section 30, an inter prediction section 35, a color gamut prediction section 40, and a LUT buffer 45.

The sorting buffer 11 sorts the images included in the series of image data. After sorting the images according to a GOP (Group of Pictures) structure according to the encoding process, the sorting buffer 11 outputs the image data which has been sorted to the subtraction section 13, the intra prediction section 30, the inter prediction section 35, and the color gamut prediction section 40.

The image data input from the sorting buffer 11 and predicted image data input by the intra prediction section 30 or the inter prediction section 35 described later are supplied to the subtraction section 13. The subtraction section 13 calculates predicted error data which is a difference between the image data input from the sorting buffer 11 and the predicted image data and outputs the calculated predicted error data to the orthogonal transform section 14.

The orthogonal transform section 14 performs orthogonal transform on the predicted error data input from the subtraction section 13. The orthogonal transform to be performed by the orthogonal transform section 14 may be discrete cosine transform (DCT) or Karhunen-Loeve transform, for example. In HEVC, an orthogonal transform is performed for each block called a transform unit (TU). The TU is a block formed by dividing a coding unit (CU). The orthogonal transform section 14 outputs transform coefficient data acquired by the orthogonal transform process to the quantization section 15.

The quantization section 15 is supplied with the transform coefficient data input from the orthogonal transform section 14 and a rate control signal from the rate control section 18 to be described below. The quantization section 15 quantizes the transform coefficient data in a quantization step determined according to the rate control signal. The quantization section 15 outputs the quantized transform coefficient data (hereinafter referred to as quantized data) to the lossless encoding section 16 and the inverse quantization section 21.

The lossless encoding section 16 performs a lossless encoding process on the quantized data input from the quantization section 15 to generate an encoded stream of an enhancement layer. The lossless encoding section 16 encodes various parameters referred to when the encoded stream is decoded and inserts the encoded parameters into a header region of the encoded stream. The parameters encoded by the lossless encoding section 16 can include information regarding intra prediction and information regarding inter prediction to be described below. Parameters related to color gamut prediction can further be encoded. Then, the lossless encoding section 16 outputs the generated encoded stream to the accumulation buffer 17.

The accumulation buffer 17 temporarily accumulates an encoded stream input from the lossless encoding section 16 using a storage medium such as a semiconductor memory. Then, the accumulation buffer 17 outputs the accumulated encoded stream to a transmission section (not shown) (for example, a communication interface or an interface to peripheral devices) at a rate in accordance with the band of a transmission path.

The rate control section 18 monitors the free space of the accumulation buffer 17. Then, the rate control section 18 generates a rate control signal according to the free space on the accumulation buffer 17, and outputs the generated rate control signal to the quantization section 15. For example, when there is not much free space on the accumulation buffer 17, the rate control section 18 generates a rate control signal for lowering the bit rate of the quantized data. Also, for example, when the free space on the accumulation buffer 17 is sufficiently large, the rate control section 18 generates a rate control signal for increasing the bit rate of the quantized data.

The inverse quantization section 21, the inverse orthogonal transform section 22, and the addition section 23 form a local decoder. In the quantization step used by the quantization section 15, the inverse quantization section 21 performs inverse quantization on the quantized data of an enhancement layer to thereby restore the transform coefficient data. Then, the inverse quantization section 21 outputs the restored transform coefficient data to the inverse orthogonal transform section 22.

The inverse orthogonal transform section 22 performs an inverse orthogonal transform process on the transform coefficient data input from the inverse quantization section 21 to thereby restore the predicted error data. As in the orthogonal transform, the inverse orthogonal transform is performed for each TU. Then, the inverse orthogonal transform section 22 outputs the restored predicted error data to the addition section 23.

The addition section 23 adds the restored predicted error data input from the inverse orthogonal transform section 22 and the predicted image data input from the intra prediction section 30 or the inter prediction section 35 to thereby generate decoded image data (reconstructed image of the enhancement layer). Then, the addition section 23 outputs the generated decoded image data to the loop filter 24 and the frame memory 25.

The loop filter 24 includes a filter group for the purpose of improving image quality. A deblock filter (DF) is a filter that reduces block distortion occurring when an image is encoded. A sample adaptive offset (SAO) filter is a filter that adds an adaptively determined offset value to each pixel value. An adaptive loop filter (ALF) is a filter that minimizes an error between an image subjected to the SAO and an original image. The loop filter 24 filters the decoded image data input from the addition section 23 and outputs the filtered decoded image data to the frame memory 25.

The frame memory 25 stores the decoded image data of the enhancement layer input from the addition section 23, the filtered decoded image data of the enhancement layer input from the loop filter 24, and reference image data of the base layer input from the color gamut prediction section 40 using a storage medium.

The selector 26 reads the decoded image data before the filtering used for the intra prediction from the frame memory 25 and supplies the read decoded image data as reference image data to the intra prediction section 30. Further, the selector 26 reads the filtered decoded image data used for the inter prediction from the frame memory 25 and supplies the read decoded image data as reference image data to the inter prediction section 35. When inter layer prediction is performed by the intra prediction section 30 or the inter prediction section 35, the selector 26 supplies the reference image data of the base layer to the intra prediction section 30 or the inter prediction section 35.

In the intra prediction mode, the selector 27 outputs predicted image data as a result of intra prediction output from the intra prediction section 30 to the subtraction section 13 and also outputs information about the intra prediction to the lossless encoding section 16. Further, in the inter prediction mode, the selector 27 outputs predicted image data as a result of inter prediction output from the inter prediction section 35 to the subtraction section 13 and also outputs information about the inter prediction to the lossless encoding section 16. The selector 27 switches the inter prediction mode and the intra prediction mode in accordance with the magnitude of a cost function value.

The intra prediction section 30 performs an intra prediction process on each prediction unit (PU) of HEVC based on the original image data and the decoded image data of the enhancement layer. For example, the intra prediction section 30 evaluates a prediction result according to each candidate mode in a prediction mode set using a predetermined cost function. Next, the intra prediction section 30 selects a prediction mode in which a cost function value is the minimum, i.e., a prediction mode in which a compression ratio is the highest, as an optimum prediction mode. The intra prediction section 30 generates predicted image data of the enhancement layer according to the optimum prediction mode. The intra prediction section 30 may include intra BL prediction which is a kind of inter layer prediction in the prediction mode set in the enhancement layer. In the intra BL prediction, a co-located block in the base layer corresponding to a prediction target block of the enhancement layer is used as a reference block, and a predicted image is generated based on a decoded image of the reference block. The intra prediction section 30 may include intra residual prediction which is a kind of inter layer prediction. In the intra residual prediction, a predicted error of intra prediction is predicted based on the predicted error image of the reference block which is the co-located block in the base layer, and a predicted image for which the predicted error has been predicted and added is generated. The intra prediction section 30 outputs information regarding the intra prediction including prediction mode information indicating the selected optimum prediction mode, the cost function value, and the predicted image data to the selector 27.

The inter prediction section 35 performs an inter prediction process on each prediction unit (PU) of HEVC based on the original image data and the decoded image data of the enhancement layer. For example, the inter prediction section 35 evaluates a prediction result according to each candidate mode in a prediction mode set using a predetermined cost function. Next, the inter prediction section 35 selects a prediction mode in which a cost function value is the minimum, i.e., a prediction mode in which a compression ratio is the highest, as an optimum prediction mode. The inter prediction section 35 generates predicted image data of the enhancement layer according to the optimum prediction mode. The inter prediction section 35 may include inter residual prediction which is a kind of inter layer prediction. In the inter residual prediction, a predicted error of intra prediction is predicted based on the predicted error image of the reference block which is the co-located block in the base layer, and a predicted image for which the predicted error has been predicted and added is generated. The intra prediction section 35 outputs information regarding the intra prediction including prediction mode information and motion information indicating the selected optimum prediction mode, the cost function value, and the predicted image data to the selector 27.

The color gamut prediction section 40 up-samples the image (the decoded image or the predicted error image) of the base layer buffered by the common memory 2 according to the resolution ratio between the base layer and the enhancement layer. When the image of the enhancement layer has a different color gamut from the image of the base layer, the color gamut prediction section 40 converts the color gamut of the up-sampled image of the base layer into the same color gamut as that of the image of the enhancement layer. In the embodiment, the color gamut prediction section 40 uses the lookup table buffered by the lookup table (LUT) buffer 45 to convert the color gamut. The image of the base layer of which the color gamut is converted by the color gamut prediction section 40 can be stored in the frame memory 25 and can be used as a reference image in the inter layer prediction by the intra prediction section 30 or the inter prediction section 35.

The LUT buffer 45 is a buffer that buffers the lookup table used by the color gamut prediction section 40. The lookup table maps combinations of the luminance component (Y), the first color difference component (U), and the second color difference component (V) of the base layer to the predicted pixel values of the enhancement layer corresponding to the combinations.

2-2. Details of Color Gamut Prediction

In the embodiment, when the color gamut prediction section 40 predicts the image of the enhancement layer from the image of the base layer, the color gamut prediction section 40 uses the lookup table in which the granularities of the first and second color difference components are rougher than the granularity of the luminance component for the color gamut prediction. For example, when the bit depth of the image of the base layer is 8 bits, the granularities of the first and second color difference components may be 9 whereas the granularity of the luminance component is 17. In this case, the color space of the base layer is divided into 17×9×9 sub-spaces and the lookup table defines the predicted pixel values (the pixel vectors of the enhancement layer) corresponding to each sub-space. When the bit depth of the enhancement layer is 10 bits, the LUT buffer 45 consumes memory resources of 17×9×9×3 (the number of color components)×10 (bit depth)=41310 bits to buffer the lookup table. The values of the granularities described above are merely examples and other values (for example, 9×5×5 or 17×5×5) may be used. The granularity of the first color difference component may be different from the granularity of the second color difference component (for example, 17×9×5 or 17×5×9).

For example, the color gamut prediction section 40 sets the granularities of the luminance component (Y), the first color difference component (U), and the second color difference component (V) according to presetting of a user or analysis of the image. The color gamut prediction section 40 determines the predicted pixel values so that a difference between the original image and the predicted image of the enhancement layer is minimized for each sub-space of the color space (Y, U, V) of the base layer divided based on the set granularities. Then, the color gamut prediction section 40 buffers the lookup table defining the mapping between each sub-space and the corresponding predicted pixel values in the LUT buffer 45. The generation of the lookup table can be performed in units of sequences, pictures, slices, or the like.

The color gamut prediction section 40 up-samples the image of the base layer acquired from the common memory 2 according to the resolution ratio between the base layer and the enhancement layer. The color gamut prediction section 40 selects the sub-space to which each pixel vector of the base layer after the up-sampling belongs and acquires the predicted pixel value mapped to the selected sub-space with reference to the lookup table. The color gamut prediction section 40 converts the color gamut of the image of the base layer by repeating the process on each pixel. Then, the color gamut prediction section 40 stores the image of the base layer after the color gamut conversion as the reference image for the inter layer prediction in the frame memory 25. The up-sampling may be performed after the color gamut conversion.

The color gamut prediction section 40 generates lookup table information to use the same lookup table as the lookup table used in the encoder in the decoder. In a first example, the lookup table information can have, for example, a syntax shown in the following Table 2.

TABLE 2

EXAMPLE OF SYNTAX OF LOOKUP TABLE INFORMATION
(FIRST EXAMPLE)

3D_LUT_color_data( ) {
    nbp_code_Luma
    nbp_code_Chroma
    lut_bit_depth_minus8
    coding_octant(0, 0, 0, 0)
}

In the first example, a parameter nbp_code_Luma defines the granularity of the luminance component in the lookup table for the color gamut prediction. A parameter nbp_code_Chroma defines the granularities of the first and second color difference components in the lookup table for the color gamut prediction. In a second example, the lookup table information can have, for example, a syntax shown in the following Table 3.

TABLE 3

EXAMPLE OF SYNTAX OF LOOKUP TABLE INFORMATION
(SECOND EXAMPLE)

3D_LUT_color_data( ) {
    nbp_code_Y
    nbp_code_U
    nbp_code_V
    lut_bit_depth_minus8
    coding_octant(0, 0, 0, 0)
}

In the second example, a parameter nbp_code_Y defines the granularity of the luminance component in the lookup table for the color gamut prediction. A parameter nbp_code_U defines the granularity of the first color difference component in the lookup table for the color gamut prediction. A parameter nbp_code_V defines the granularity of the second color difference component in the lookup table for the color gamut prediction.

The color gamut prediction section 40 generates the lookup table information having the syntax and outputs the generated lookup table to the lossless encoding section 16. The lossless encoding section 16 encodes the input lookup table information and inserts the encoded information into the header region of the encoded stream. For example, the lookup table information may be encoded inside a Video Parameter Set (VPS) or an extension thereof, a Sequence Parameter Set (SPS) or an extension thereof, a Picture Parameter Set (PPS) or an extension thereof, or the slice header or an extension thereof in the encoded stream. The lookup table information may be encoded inside Supplemental Enhancement Information (SEI). When the lookup table information is encoded inside the SEI, an application such as conversion of the color gamut at the time of display on a display is also possible instead of decoding of an image.

When the lookup table is known to both of the encoder and the decoder, the lookup table information may not be transmitted from the encoder to the decoder. When the granularities of the three color components of the lookup table are defined in advance to be fixed, lookup table information indicating that granularity information is not included may be transmitted from the encoder to the decoder.

In a modification example, for example, when the chroma format indicates that the resolutions of the first and second color difference components are lower than the resolution of the luminance component, the color gamut prediction section 40 may use a lookup table in which the granularities of the first and second color difference components are rougher than the granularity of the luminance component. For example, when the chroma format is 4:2:0, the resolutions of the color difference components are less than the resolution of the luminance component in both of the vertical and horizontal directions. When the chroma format is 4:2:2, the resolutions of the color difference components are lower than the resolution of the luminance component in the horizontal direction. In these cases, an influence of deterioration of the prediction precision caused due to the reduction in the granularities of the lookup table on the encoding efficiency is lower in the color difference components than in the luminance component. Accordingly, by reducing the granularities of only the color difference components of the lookup table in these cases, it is possible to efficiently reduce a buffer size of the lookup table while suppressing sacrifice of the encoding efficiency. On the other hand, when the chroma format is 4:4:4, i.e., when the resolution of the color difference components are the same as the resolution of the luminance component, the color gamut prediction section 40 may use a lookup table which has a common granularity to the luminance component, the first color difference component, and the second color difference component, as in the known method.

3. PROCESS FLOW FOR ENCODING ACCORDING TO AN EMBODIMENT

3-1. Schematic Flow

Figure 6:
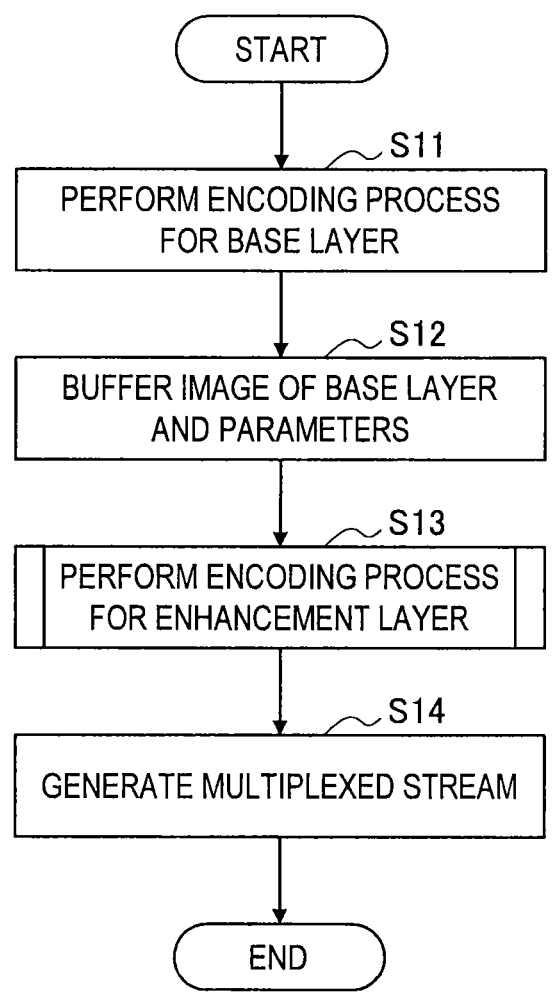
FIG. 6 is a flow chart showing an example of a schematic process flow for encoding according to an embodiment.

FIG. 6 is a flow chart showing an example of a schematic process flow for encoding according to an embodiment. For the sake of brevity of description, process steps that are not directly related to technology according to the present disclosure are omitted from FIG. 6.

Referring to FIG. 6, the BL encoding section 1a first performs an encoding process for the base layer to generate an encoded stream of the base layer (step S11).

The common memory 2 buffers an image (one or both of a decoded image and a predicted error image) of the base layer generated in the encoding process for the base layer and the parameters reused between the layers (step S12). The parameters reused between the layers may include the resolution information, for example.

Next, the EL encoding section 1b performs an encoding process for the enhancement layer to generate an encoded stream of the enhancement layer (step S13). In the encoding process for the enhancement layer performed herein, the image of the base layer buffered by the common memory 2 is up-sampled by the color gamut prediction section 40 so that the color gamut is converted. Then, the image of the base layer after the color gamut conversion can be used as a reference image in the inter layer prediction.

Then, the multiplexing section 3 multiplexes an encoded stream of the base layer generated by the BL encoding section 1a and an encoded stream of the enhancement layer generated by the EL encoding section 1b to generate a multilayer multiplexed stream (step S14).

3-2. Color Gamut Prediction Process

Figure 7:
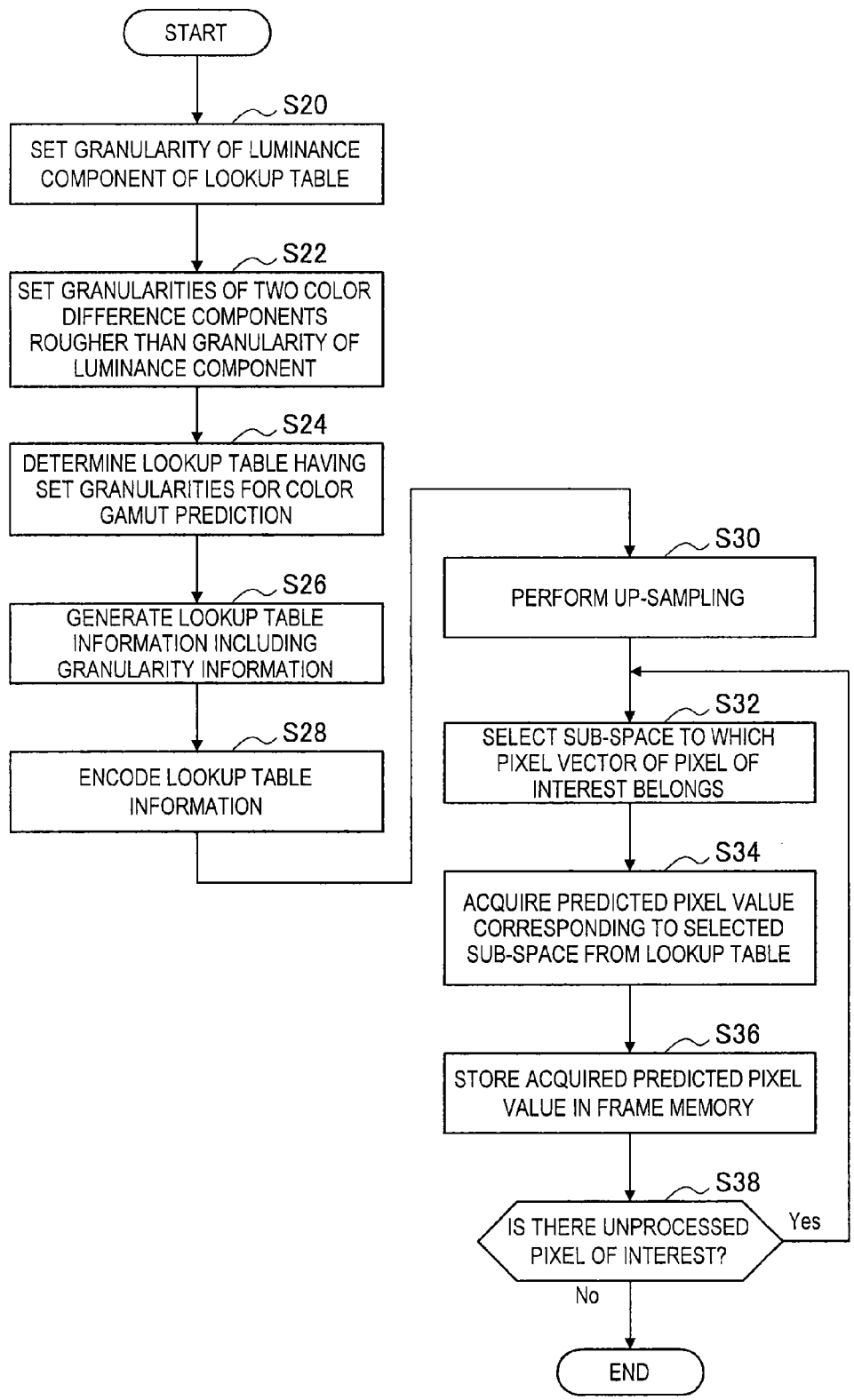
FIG. 7 is a flow chart showing an example of the flow of a color gamut prediction process in an encoding process for an enhancement layer.

FIG. 7 is a flowchart showing an example of a process flow of the color gamut prediction process in the encoding process for the enhancement layer. The color gamut prediction process described herein can be repeated in units (for example, units of sequences, pictures, or slices) in which the lookup table is updated.

Referring to FIG. 7, the color gamut prediction section 40 first sets the granularity of the luminance component of the lookup table according to the presetting of the user or the analysis of the image (step S20). The color gamut prediction section 40 sets the granularities of the first and second color difference components rougher than the granularity of the luminance component (step S22). Next, the color gamut prediction section 40 determines the lookup table having the set granularities for the color gamut prediction and buffers the determined lookup table in the LUT buffer 45 (step S24). The LUT buffer 45 maintains the lookup table determined by the color gamut prediction section 40 until subsequent updating of the lookup table.

Next, the color gamut prediction section 40 generates the lookup table information defining the lookup table by, for example, the syntax shown in Table 2 or 3 (step S26). The lookup table information generated herein includes granularity information defining the granularities (common or separate granularities) of the first and second color difference components in addition to granularity information defining the granularity of the luminance component. Then, the lossless encoding section 16 encodes the lookup table information generated by the color gamut prediction section 40 (step S28).

The color gamut prediction section 40 up-samples the image of the base layer acquired from the common memory 2 according to the resolution ratio between the base layer and the enhancement layer (step S30). Subsequent processes of steps S32 to S38 are repeated for each pixel using each pixel after the up-sampling as a pixel of interest. The color gamut prediction section 40 first selects the sub-space of the 3-dimensional color space divided by the granularities of the three color components to which the pixel vector of the pixel of interest belongs (step S32). Next, the color gamut prediction section 40 acquires the predicted pixel value corresponding to the selected sub-space from the 3-dimensional lookup table buffered by the LUT buffer 45 (step S34). The color gamut prediction section 40 stores the acquired predicted pixel value of the pixel of interest in the frame memory 25 (step S36).

Thereafter, when there is a subsequent unprocessed pixel of interest, the process returns to step S32 and the color gamut prediction is repeated on the subsequent pixel of interest (step S38). The up-sampling may also be repeated. When there is no subsequent pixel of interest, the color gamut prediction process shown in FIG. 7 ends.

4. CONFIGURATION EXAMPLE OF EL DECODING SECTION IN AN EMBODIMENT

4-1. Overall Configuration

Figure 8:
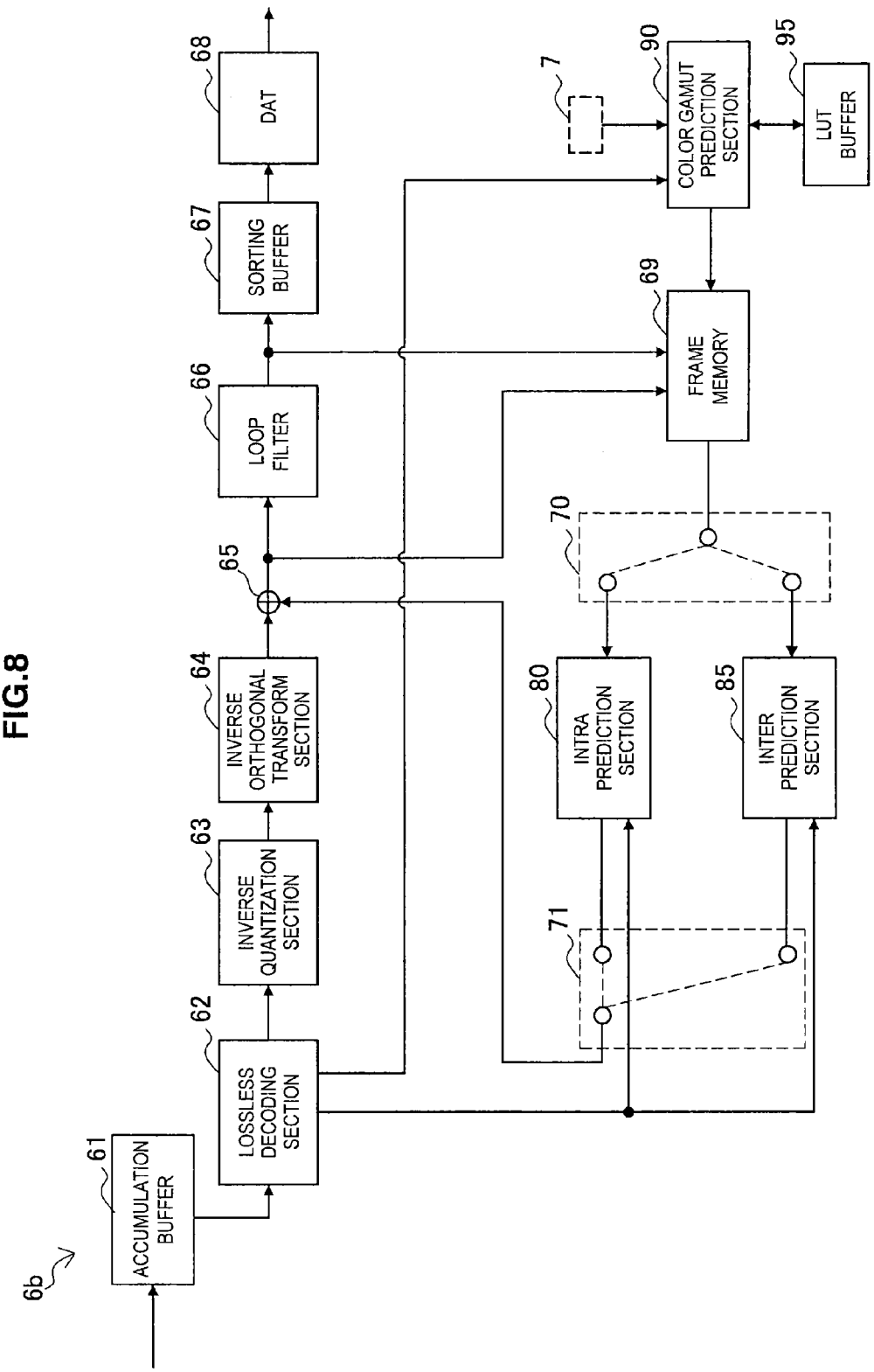
FIG. 8 is a block diagram showing an example of the configuration of an EL decoding section shown in FIG. 4.

FIG. 8 is a block diagram showing an example of the configuration of the EL decoding section 6b shown in FIG. 4. Referring to FIG. 8, the EL decoding section 6b includes an accumulation buffer 61, a lossless decoding section 62, an inverse quantization section 63, an inverse orthogonal transform section 64, an addition section 65, a loop filter 66, a sorting buffer 67, a digital-to-analog (D/A) conversion section 68, a frame memory 69, selectors 70 and 71, an intra prediction section 80, an inter prediction section 85, a color gamut prediction section 90, and a LUT buffer 95.

The accumulation buffer 61 temporarily accumulates the encoded stream of the enhancement layer input from the demultiplexing section 5 using a storage medium.

The lossless decoding section 62 decodes the quantized data of the enhancement layer from the encoded stream of the enhancement layer input from the accumulation buffer 61 according to the encoding scheme used at the time of the encoding. The lossless decoding section 62 decodes the information inserted into the header region of the encoded stream. The information decoded by the lossless decoding section 62 can include, for example, the information regarding the intra prediction and the information regarding the inter prediction. The parameters for the color gamut prediction (for example, the lookup table information) can also be decoded in the enhancement layer. The lossless decoding section 62 outputs the quantized data to the inverse quantization section 63. The lossless decoding section 62 outputs the information regarding the intra prediction to the intra prediction section 80. The lossless decoding section 62 outputs the information regarding the inter prediction to the inter prediction section 85. The lossless decoding section 62 outputs the parameters for the color gamut prediction to the color gamut prediction section 90.

The inverse quantization section 63 inversely quantizes the quantized data input from the lossless decoding section 62 in the quantization step used at the time of the encoding to restore the transform coefficient data of the enhancement layer. The inverse quantization section 63 outputs the restored transform coefficient data to the inverse orthogonal transform section 64.

The inverse orthogonal transform section 64 performs an inverse orthogonal transform on the transform coefficient data input from the inverse quantization section 63 according to the orthogonal transform scheme used at the time of the encoding to generate the predicted error data. The inverse orthogonal transform section 64 outputs the generated predicted error data to the addition section 65.

The addition section 65 adds the predicted error data input from the inverse orthogonal transform section 64 and the predicted image data input from the selector 71 to generate decoded image data. Then, the addition section 65 outputs the generated decoded image data to the loop filter 66 and the frame memory 69.

As in the loop filter 24 of the EL encoding section 1b, the loop filter 66 includes a deblock filter that reduces block distortion, a sample adaptive offset filter that adds an offset value to each pixel value, and an adaptive loop filter that minimizes an error with the original image. The loop filter 66 filters the decoded image data input from the addition section 65 and outputs the decoded image data after filtering to the sorting buffer 67 and the frame memory 69.

The sorting buffer 67 sorts the images input from the loop filter 66 to generate a chronological series of image data. Then, the sorting buffer 67 outputs the generated image data to the D/A conversion section 68.

The D/A conversion section 68 converts the image data with a digital format input from the sorting buffer 67 into an image signal with an analog format. Then, the D/A conversion section 68 displays the image of the enhancement layer by outputting the analog image signal to, for example, a display (not shown) connected to the image decoding device 60.

The frame memory 69 stores the decoded image data before the filtering input from the addition section 65, the decoded image data after the filtering input from the loop filter 66, and the reference image data of the base layer input from the color gamut prediction section 90 using a storage medium.

The selector 70 switches an output destination of the image data from the frame memory 69 between the intra prediction section 80 and the inter prediction section 85 for each block in the image according to the mode information acquired by the lossless decoding section 62. For example, when the intra prediction mode is designated, the selector 70 outputs the decoded image data before the filtering supplied from the frame memory 69 as the reference image data to the intra prediction section 80. When the inter prediction mode is designated, the selector 70 outputs the decoded image data after the filtering as the reference image data to the inter prediction section 85. When the inter layer prediction is performed in the intra prediction section 80 or the inter prediction section 85, the selector 70 supplies the reference image data of the base layer to the intra prediction section 80 or the inter prediction section 85.

The selector 71 switches an output source of the predicted image data to be supplied to the addition section 65 between the intra prediction section 80 and the inter prediction section 85 according to the mode information acquired by the lossless decoding section 62. For example, when the intra prediction mode is designated, the selector 71 supplies the predicted image data output from the intra prediction section 80 to the addition section 65. When the inter prediction mode is designated, the selector 71 supplies the predicted image data output from the inter prediction section 85 to the addition section 65.

The intra prediction section 80 performs the intra prediction process of the enhancement layer based on the information regarding the intra prediction input from the lossless decoding section 62 and the reference image data from the frame memory 69 to generate predicted image data. The intra prediction process is performed for each PU. When the intra BL prediction or the intra residual prediction is designated as the intra prediction mode, the intra prediction section 80 uses a co-located block in the base layer corresponding to a prediction target block as a reference block. In the case of the intra BL prediction, the intra prediction section 80 generates the predicted image based on the decoded image of the reference block. In the case of the intra residual prediction, the intra prediction section 80 predicts a prediction error of the intra prediction based on the predicted error image of the reference block and generates the predicted image to which the predicted prediction error is added. The intra prediction section 80 outputs the generated predicted image data of the enhancement layer to the selector 71.

The inter prediction section 85 performs an inter prediction process (motion compensation process) of the enhancement layer based on the information regarding the inter prediction input from the lossless decoding section 62 and the reference image data from the frame memory 69 to generate predicted image data. The inter prediction process is performed for each PU. When the inter residual prediction is designated as the inter prediction mode, the inter prediction section 85 uses a co-located block in the base layer corresponding to a prediction target block as a reference block. In the case of the inter residual prediction, the inter prediction section 85 predicts a prediction error of the inter prediction based on the predicted error image of the reference block and generates a predicted image to which the predicted prediction error is added. The inter prediction section 85 outputs the generated predicted image data of the enhancement layer to the selector 71.

The color gamut prediction section 90 up-samples the image (the decoded image or the predicted error image) of the base layer buffered in the common memory 7 according to a resolution ratio between the base layer and the enhancement layer. When the image of the enhancement layer has a different color gamut from the image of the base layer, the color gamut prediction section 90 converts the color gamut of the up-sampled image of the base layer into the same color gamut as the image of the enhancement layer. In the embodiment, the color gamut prediction section 90 uses a lookup table buffered by the LUT buffer 95 to convert the color gamut. The image of the base layer of which the color gamut is converted by the color gamut prediction section 90 can be stored in the frame memory 69 to be used as a reference image in the inter layer prediction by the intra prediction section 80 or the inter prediction section 85.

The LUT buffer 95 is a buffer that buffers the lookup table used by the color gamut prediction section 90. The lookup table maps combinations of the luminance component (Y), the first color difference component (U), and the second color difference component (V) of the base layer to the predicted pixel values of the enhancement layer corresponding to the combinations.

4-2. Details of Color Gamut Prediction

In the embodiment, as in the color gamut prediction section 40 described above, the color gamut prediction section 90 uses the lookup table in which the granularities of the first and second color difference components are rougher than the granularity of the luminance component for the color gamut prediction when the color gamut prediction section 90 predicts the image of the enhancement layer from the image of the base layer. The color space of the base layer is divided into a plurality of sub-spaces based on the granularities of the three color components and the lookup table defines the predicted pixel values (pixel vectors of the enhancement layer) corresponding to each sub-space.

The color gamut prediction section 90 acquires the lookup table information decoded by the lossless decoding section 62. As described in Table 2 or 3, the lookup table information can include granularity information defining granularities to be set for the luminance component (Y), the first color difference component (U), and the second color difference component (V). Apart from the parameter defining the granularity of the luminance component, the granularity information may include one parameter commonly defining a granularity of the first and second color difference components. Instead, the granularity information may include separate parameters each defining the granularities of the first and second color difference components. The lookup table information may include a parameter defining the depth bit of the predicted pixel value and information defining content (mapping between input pixel values and predicted pixel values) of the lookup table. The color gamut prediction section 90 generates the lookup table defining the mapping between each of the plurality of sub-spaces of the color space of the base layer and the corresponding predicted pixel values based on the lookup table information and buffers the generated lookup table in the LUT buffer 95. The acquisition of the lookup table information and the generation of the lookup table can be performed in units of sequences, pictures, or slices. For example, the lookup table information may be encoded inside the VPS or an extension thereof, the SPS or an extension thereof, the PPS or an extension thereof, or the slice header or an extension thereof in the encoded stream. The lookup table information may be decoded from the SEI and may be used to convert the color gamut at the time of display on a display.

After the lookup table to be used is generated, the color gamut prediction section 90 up-samples the image of the base layer acquired from the common memory 7 according to the resolution ratio between the base layer and the enhancement layer. Then, the color gamut prediction section 90 selects the sub-space to which each pixel vector of the base layer after the up-sampling belongs and acquires the predicted pixel value mapped to the selected sub-space with reference to the lookup table. The color gamut prediction section 90 converts the color gamut of the image of the base layer by repeating the process on each pixel. Then, the color gamut prediction section 90 stores the image of the base layer after the color gamut conversion as the reference image for the inter layer prediction in the frame memory 69. The up-sampling may be performed after the color gamut conversion.

In a modification example, for example, when the chroma format indicates that the resolutions of the first and second color difference components are lower than the resolution of the luminance component, the color gamut prediction section 90 may use a lookup table in which the granularities of the first and second color difference components are rougher than the granularity of the luminance component. When the resolutions of the color difference components are lower than the resolution of the luminance component, it is possible to efficiently reduce a buffer size of the lookup table while suppressing sacrifice of the encoding efficiency by reducing the granularities of only the color difference components of the lookup table. On the other hand, when the chroma format indicates that the resolutions of the color difference components are the same as the resolution of the luminance component, the color gamut prediction section 90 may use a lookup table which has a common granularity to the luminance component, the first color difference component, and the second color difference component, as in the known method.

5. PROCESS FLOW FOR DECODING ACCORDING TO AN EMBODIMENT

5-1. Schematic Flow

Figure 9:
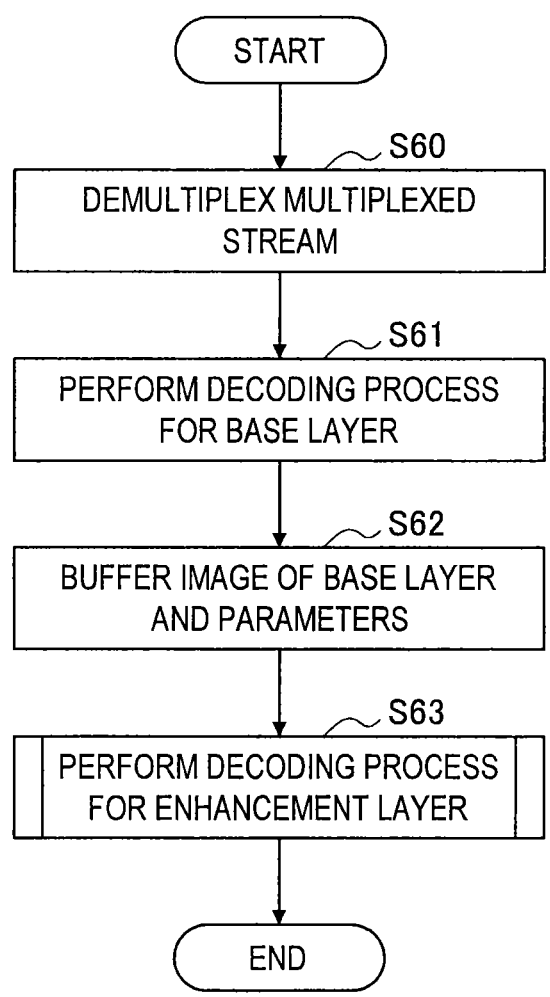
FIG. 9 is a flow chart showing an example of a schematic process flow at the time of decoding according to an embodiment.

FIG. 9 is a flow chart showing an example of a schematic process flow at the time of the decoding according to an embodiment. For the sake of brevity of description, process steps not directly relevant to the technology in the present disclosure are omitted from the drawing.

Referring to FIG. 9, the demultiplexing section 5 first demultiplexes the multilayer multiplexed stream into the encoded stream of the base layer and the encoded stream of the enhancement layer (step S60).

Next, the BL decoding section 6a performs the decoding process of the base layer to reconstruct the image of the base layer from the encoded steam of the base layer (step S61).

The common memory 7 buffers an image (one or both of a decoded image and a predicted error image) of the base layer generated in the decoding process for the base layer and the parameters reused between the layers (step S62). The parameters reused between the layers may include the resolution information, for example.

Next, the EL decoding section 6b performs the decoding process for the enhancement layer to reconstruct the image of the enhancement layer (step S63). In the decoding process for the enhancement layer performed herein, the image of the base layer buffered by the common memory 7 is up-sampled by the color gamut prediction section 90 so that the color gamut is converted. The image of the base layer after the color gamut conversion can be used as a reference image in the inter layer prediction.

5-2. Color Gamut Prediction Process

Figure 10:
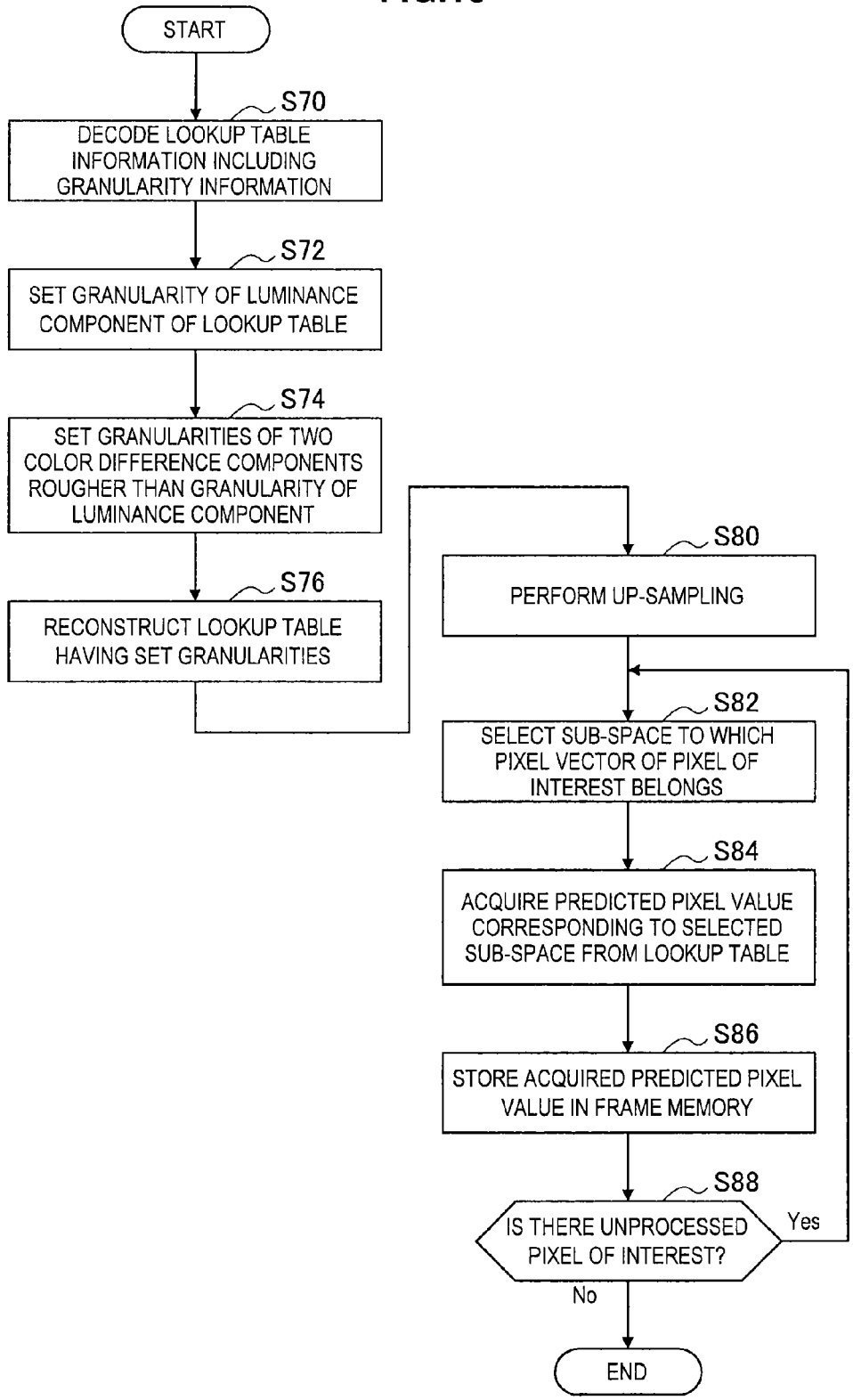
FIG. 10 is a flow chart showing an example of the flow of a color gamut prediction process in a decoding process for an enhancement layer.

FIG. 10 is a flowchart showing an example of a process flow of the color gamut prediction process in the decoding process for the enhancement layer. The color gamut prediction process described herein can be repeated in units (for example, units of sequences, pictures, or slices) in which the lookup table is updated.

Referring to FIG. 10, the lossless decoding section 62 first decodes the lookup table information including the granularity information from the header region of the encoded stream (step S70). Next, the color gamut prediction section 90 sets the granularity of the luminance component of the lookup table according to the decoded granularity information (step S72). Then, the color gamut prediction section 90 sets the granularities of the first and second color difference components rougher than the granularity of the luminance component according to the decoded granularity information (step S74). Next, the color gamut prediction section 90 reconstructs (sets) the lookup table having the set granularities and buffers the reconstructed lookup table in the LUT buffer 95 (step S76). The LUT buffer 95 maintains the lookup table reconstructed by the color gamut prediction section 90 until subsequent updating.

The color gamut prediction section 90 up-samples the image of the base layer acquired from the common memory 7 according to the resolution ratio between the base layer and the enhancement layer (step S80). Subsequent processes of steps S82 to S88 are repeated for each pixel using each pixel after the up-sampling as a pixel of interest. The color gamut prediction section 90 first selects the sub-space of the 3-dimensional color space divided by the granularities of the three color components to which the pixel vector of the pixel of interest belongs (step S82). Next, the color gamut prediction section 90 acquires the predicted pixel value corresponding to the selected sub-space from the 3-dimensional lookup table buffered by the LUT buffer 95 (step S84). The color gamut prediction section 90 stores the acquired predicted pixel value of the pixel of interest in the frame memory 69 (step S86).

Thereafter, when there is a subsequent unprocessed pixel of interest, the process returns to step S82 and the color gamut prediction is repeated on the subsequent pixel of interest (step S88). The up-sampling may also be repeated. When there is no subsequent pixel of interest, the color gamut prediction process shown in FIG. 10 ends.

6. DYNAMIC RANGE SCALABILITY

The idea of the present disclosure that the lookup table in which the granularities of the color difference components are rougher than the granularity of the luminance component is used for image prediction between the layers can be applied not only to the color gamut scalability but also to other kinds of scalable encoding. For example, a pixel dynamic range is an important attribute which has an influence on an image quality. The maximum luminance of a Standard Dynamic Range (SDR) image supported by many known displays is 100 nits. On the other hand, the maximum luminance of a High Dynamic Range (HDR) image supported by high-end displays available in the latest markets reaches, for example, 800 nits. An SDR image is called a Low Dynamic Range (LDR) image in contrast to an HDR image.

Figure 11:
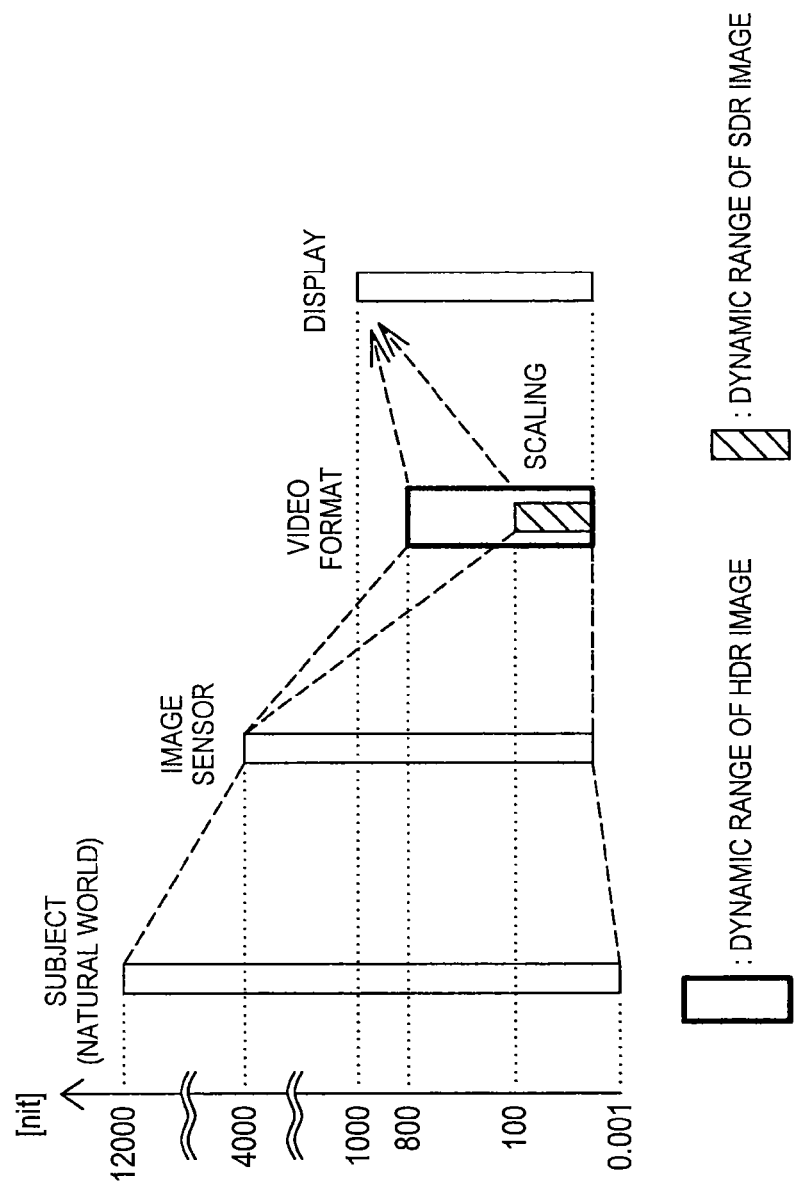
FIG. 11 is an explanatory view illustrating a dynamic range of a video format.

FIG. 11 is an explanatory view illustrating a dynamic range of a video format. The vertical axis of FIG. 11 represents luminance [nits]. The maximum luminance of the natural world reaches 20000 nits and the maximum luminance of a general subject is, for example, about 12000 nits. On the other hand, the upper limit of the dynamic range of an image sensor is lower than the maximum luminance of the natural world and can be, for example, 4000 nits. An image signal generated by an image sensor is further recorded in a predetermined video format. The dynamic range of an SDR image is shown by a bar shaded with diagonal lines in the drawing and the upper limit of this dynamic range is 100 nits. Accordingly, when a captured image is recorded as an SDR image, a luminance dynamic range is considerably compressed by, for example, a method such as knee compression. When the maximum luminance which can be expressed by a display is 1000 nits, scaling is performed 10 times at the time of display of an SDR image. However, the image quality of a display image easily deteriorates as the result of scaling. The dynamic range of an HDR image is shown by a thick-frame bar in the drawing and the upper limit of this dynamic range is 800 nits. Accordingly, when a captured image is recorded as an HDR image, a luminance dynamic range is also compressed by, for example, a method such as knee compression. When the maximum luminance which can be expressed by a display is 1000 nits, scaling is performed 1.25 times at the time of display of an HDR image. However, since a scaling ratio is small, the deterioration in the image quality of a display image is small.

Accordingly, when an HDR image is supported as a video format, there is a benefit that high-quality images can be supplied to users. Further, for the purpose of ensuring compatibility with a device which supports an SDR image and dealing with storage restriction and various transmission bands, it is beneficial to realize a scalable encoding technology called dynamic range scalability. In the dynamic range scalability, an SDR image is transmitted with the base layer and information for restoring an HDR image from the SDR image is transmitted with the enhancement layer. In order to restore an HDR image from an SDR image, it is important to keep mounting as simple as possible and ensure format versatility and scalability.

A document "High Dynamic Range Video Distribution Using Existing Video Codecs" (David Touze, et al., 30th Picture Coding Symposium, 8 to 11 Dec., 2013) proposes a technology which can be said to be one dynamic range scalability form. However, in the technology proposed in this document, in order to restore an HDR image, it is necessary to use a complex algorithm for filtering of filter taps configured from pixel values extending across a plurality of frames and gamma correction in RGB regions, and the like. On the other hand, when a method of acquiring predicted pixel values of an HDR image corresponding to combinations of three color components of an SDR image from a 3-dimensional lookup table is adopted as in the above-described color gamut scalability, an image quality corresponding to an HDR image can be restored without performing complex mounting.

Figure 12:
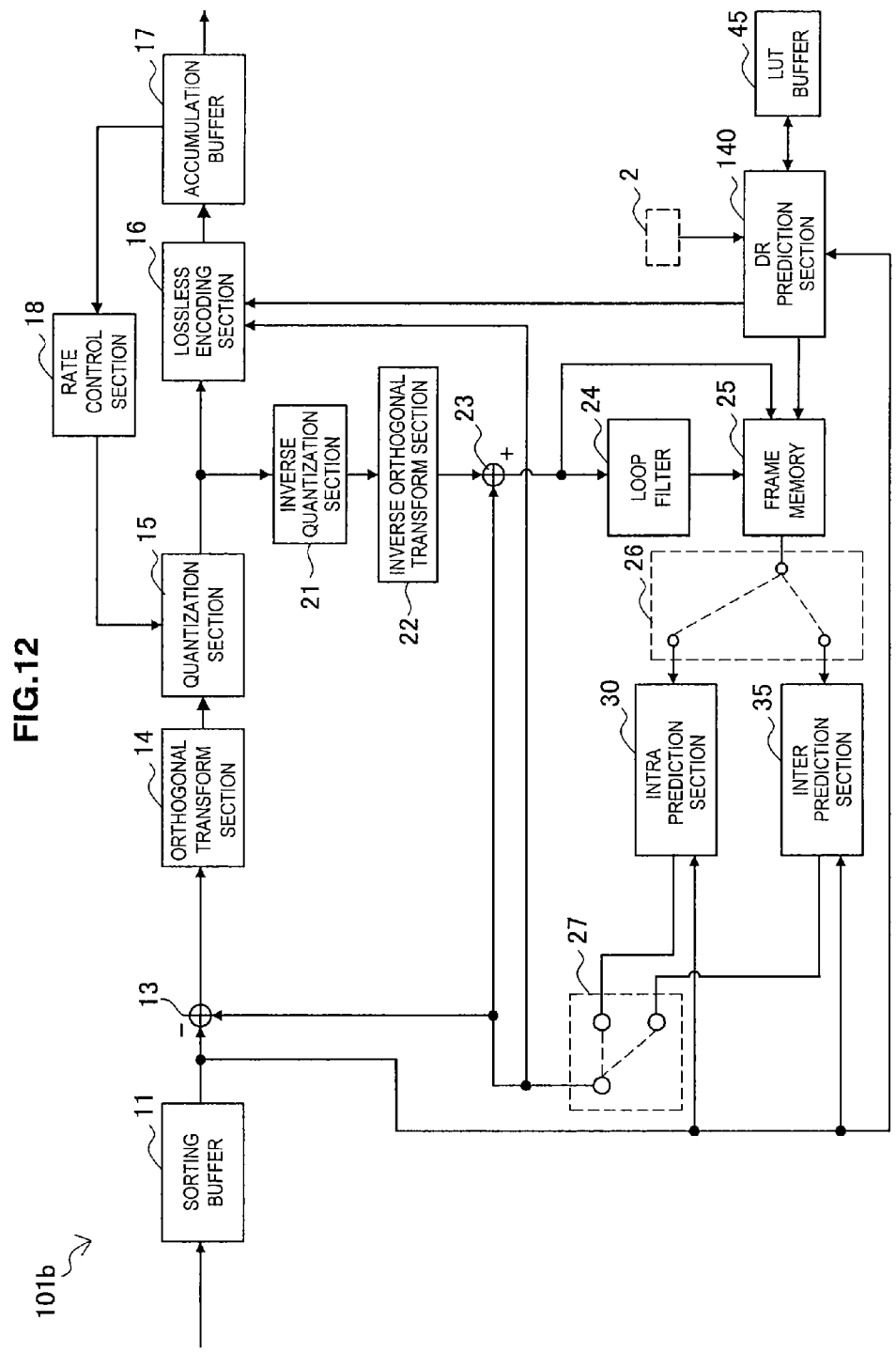
FIG. 12 is a block diagram showing an example of the configuration of an EL encoding section to realize dynamic range scalability.

For example, to realize the dynamic range scalability, an EL encoding section 101b shown in FIG. 12 may be used instead of the EL encoding section 1b shown in FIG. 3. Referring to FIG. 12, the EL encoding section 101b includes a sorting buffer 11, a subtraction section 13, an orthogonal transform section 14, a quantization section 15, a lossless encoding section 16, an accumulation buffer 17, a rate control section 18, an inverse quantization section 21, an inverse orthogonal transform section 22, an addition section 23, a loop filter 24, a frame memory 25, selectors 26 and 27, an intra prediction section 30, an inter prediction section 35, a dynamic range (DR) prediction section 140, and an LUT buffer 45.

The DR prediction section 140 up-samples the image of the base layer buffered by the common memory 2 according to the resolution ratio between the base layer and the enhancement layer. When the image of the enhancement layer has a different dynamic range from the image of the base layer, the DR prediction section 140 converts the dynamic range of the up-sampled image of the base layer into the same range as that of the image of the enhancement layer. In the embodiment, the DR prediction section 140 uses the lookup table buffered by the LUT buffer 45 to convert the dynamic range. The image of the base layer of which the dynamic range is converted by the DR prediction section 140 can be stored in the frame memory 25 to be used as a reference image in the inter layer prediction by the intra prediction section 30 or the inter prediction section 35.

Figure 13:
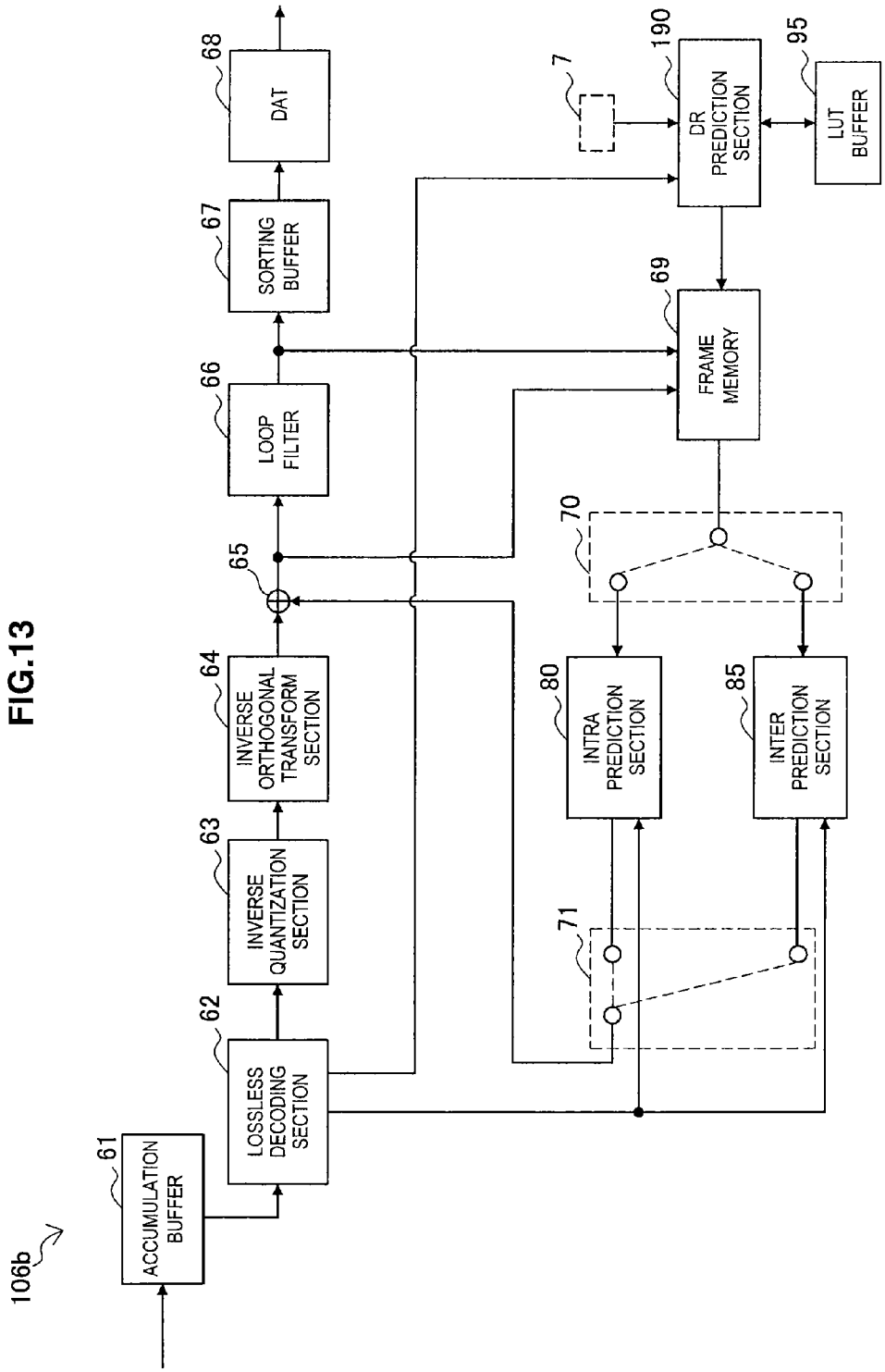
FIG. 13 is a block diagram showing an example of the configuration of an EL decoding section to realize dynamic range scalability.

Further, to realize the dynamic range scalability, an EL decoding section 106b shown in FIG. 13 may be used instead of the EL decoding section 6b shown in FIG. 4. Referring to FIG. 13, the EL decoding section 106b includes an accumulation buffer 61, a lossless decoding section 62, an inverse quantization section 63, an inverse orthogonal transform section 64, an addition section 65, a loop filter 66, a sorting buffer 67, a D/A conversion section 68, a frame memory 69, selectors 70 and 71, an intra prediction section 80, an inter prediction section 85, a DR prediction section 190, and an LUT buffer 95.

The DR prediction section 190 up-samples the image of the base layer buffered by the common memory 7 according to the resolution ratio between the base layer and the enhancement layer. When the image of the enhancement layer has a different dynamic range from the image of the base layer, the DR prediction section 190 converts the dynamic range of the up-sampled image of the base layer into the same range as that of the image of the enhancement layer. In the embodiment, the DR prediction section 190 uses the lookup table buffered by the LUT buffer 95 to convert the dynamic range. The image of the base layer of which the dynamic range is converted by the DR prediction section 190 can be stored in the frame memory 69 to be used as a reference image in the inter layer prediction by the intra prediction section 80 or the inter prediction section 85.

Here, when the DR prediction sections 140 and 190 predict the image of the enhancement layer from the image of the base layer, DR prediction sections 140 and 190 use the lookup table in which the granularities of the first and second color difference components are rougher than the granularity of the luminance component. A combination of the granularities of the three color components may be any of the combinations described above in association with the color gamut scalability. The LUT buffers 45 and 95 buffer a lookup table for dynamic range (DR) prediction which defines mappings between the sub-spaces of the color space of the base layer divided based on the granularities and the corresponding predicted pixel values.

When the granularities of the two color difference components are the same in the lookup table for the DR prediction, the DR prediction section 140 of the EL encoding section 101b can generate lookup table information including one parameter (for example, nbp_code_Luma) defining the granularity of the luminance component and one parameter (for example, nbp_code_Chroma) defining the granularity of the color difference components. On the other hand, when the granularities of the two color difference components are different in the lookup table for the DR prediction, the DR prediction section 140 can generate lookup table information including one parameter (for example, nbp_code_Y) defining the granularity of the luminance component and two parameters (for example, nbp_code_U and nbp_code_V) defining the granularities of the first and second color difference components. A syntax of the lookup table information may be the same as that exemplified in Table 2 or 3. The lookup table information can be encoded by the lossless encoding section 16 and can be transmitted inside the VPS or an extension thereof, the SPS or an extension thereof, the PPS or an extension thereof, the slice header or an extension thereof, or the SEI. The transmitted lookup table information for the DR prediction can be decoded by the lossless decoding section 62 in the EL decoding section 106b and can be used so that the lookup table is generated by the DR prediction section 190.

In a modification example, in the dynamic range scalability, the granularity of each color component of the lookup table may also be switched depending on the chroma format. For example, when the chroma format indicates that the resolutions of the first and second color difference components are lower than the resolution of the luminance component, the lookup table in which the granularities of the first and second color difference components are rougher than the granularity of the luminance component can be used. On the other hand, when the chroma format indicates that the resolutions of the first and second color difference components are the same as the resolution of the luminance component, the lookup table in which the granularities of the three color components are the same can be used.

7. EXAMPLE APPLICATION

7-1. Application to Various Products

The image encoding device 10 and the image decoding device 60 according to the embodiment described above may be applied to various electronic appliances such as a transmitter and a receiver for satellite broadcasting, cable broadcasting such as cable TV, distribution on the Internet, distribution to terminals via cellular communication, and the like, a recording device that records images in a medium such as an optical disc, a magnetic disk or a flash memory, a reproduction device that reproduces images from such storage medium, and the like. Four example applications will be described below.

(1) First Application Example

Figure 14:
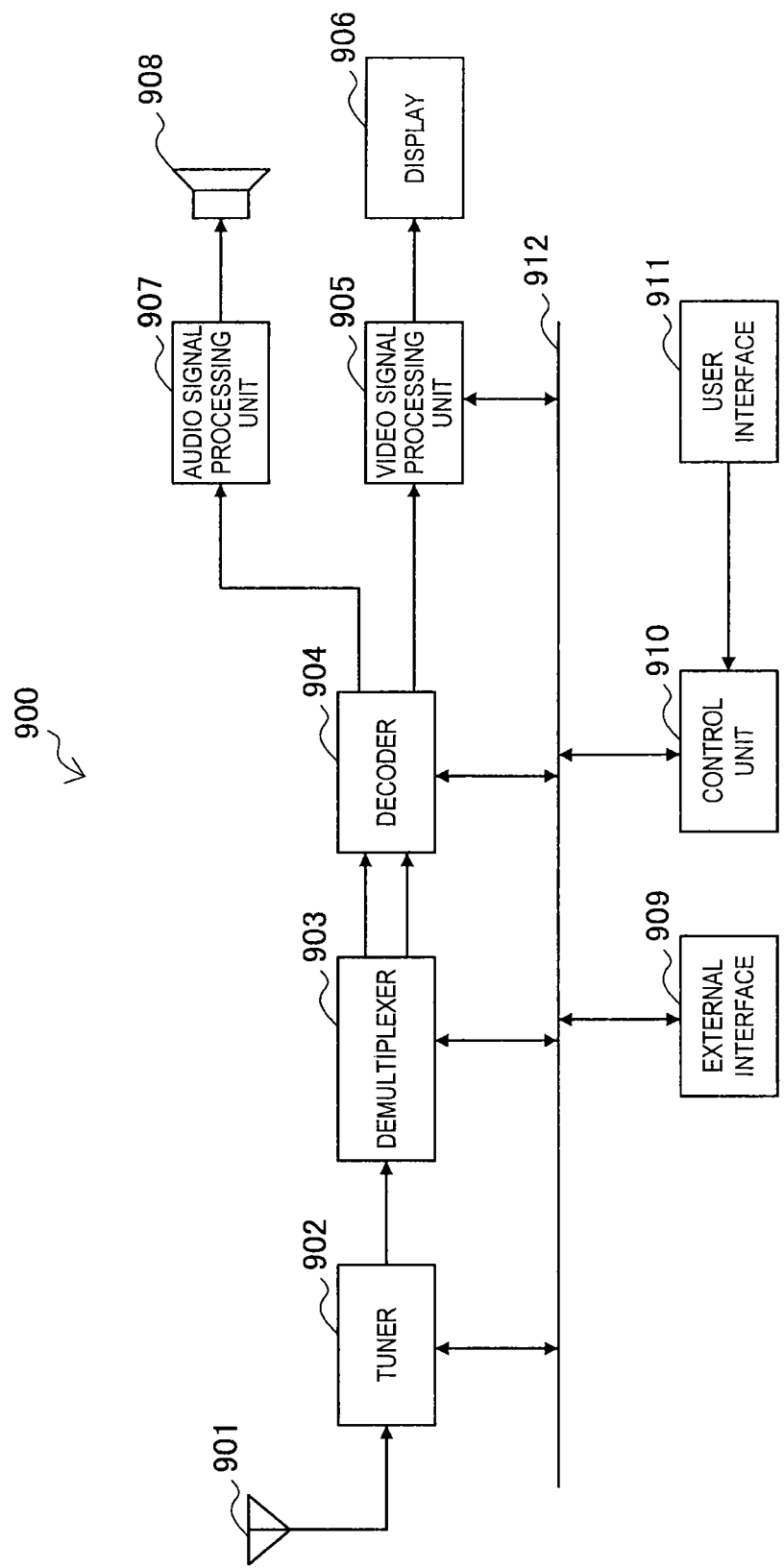
FIG. 14 is a block diagram showing an example of a schematic configuration of a television.

FIG. 14 is a diagram illustrating an example of a schematic configuration of a television device applying the aforementioned embodiment. A television device 900 includes an antenna 901, a tuner 902, a demultiplexer 903, a decoder 904, a video signal processing unit 905, a display 906, an audio signal processing unit 907, a speaker 908, an external interface 909, a control unit 910, a user interface 911, and a bus 912.

The tuner 902 extracts a signal of a desired channel from a broadcast signal received through the antenna 901 and demodulates the extracted signal. The tuner 902 then outputs an encoded bit stream obtained by the demodulation to the demultiplexer 903. That is, the tuner 902 has a role as transmission means receiving the encoded stream in which an image is encoded, in the television device 900.

The demultiplexer 903 isolates a video stream and an audio stream in a program to be viewed from the encoded bit stream and outputs each of the isolated streams to the decoder 904. The demultiplexer 903 also extracts auxiliary data such as an EPG (Electronic Program Guide) from the encoded bit stream and supplies the extracted data to the control unit 910. Here, the demultiplexer 903 may descramble the encoded bit stream when it is scrambled.

The decoder 904 decodes the video stream and the audio stream that are input from the demultiplexer 903. The decoder 904 then outputs video data generated by the decoding process to the video signal processing unit 905. Furthermore, the decoder 904 outputs audio data generated by the decoding process to the audio signal processing unit 907.

The video signal processing unit 905 reproduces the video data input from the decoder 904 and displays the video on the display 906. The video signal processing unit 905 may also display an application screen supplied through the network on the display 906. The video signal processing unit 905 may further perform an additional process such as noise reduction on the video data according to the setting. Furthermore, the video signal processing unit 905 may generate an image of a GUI (Graphical User Interface) such as a menu, a button, or a cursor and superpose the generated image onto the output image.

The display 906 is driven by a drive signal supplied from the video signal processing unit 905 and displays video or an image on a video screen of a display device (such as a liquid crystal display, a plasma display, or an OELD (Organic ElectroLuminescence Display)).

The audio signal processing unit 907 performs a reproducing process such as D/A conversion and amplification on the audio data input from the decoder 904 and outputs the audio from the speaker 908. The audio signal processing unit 907 may also perform an additional process such as noise reduction on the audio data.

The external interface 909 is an interface that connects the television device 900 with an external device or a network. For example, the decoder 904 may decode a video stream or an audio stream received through the external interface 909. This means that the external interface 909 also has a role as the transmission means receiving the encoded stream in which an image is encoded, in the television device 900.

The control unit 910 includes a processor such as a CPU and a memory such as a RAM and a ROM. The memory stores a program executed by the CPU, program data, EPG data, and data acquired through the network. The program stored in the memory is read by the CPU at the start-up of the television device 900 and executed, for example. By executing the program, the CPU controls the operation of the television device 900 in accordance with an operation signal that is input from the user interface 911, for example.

The user interface 911 is connected to the control unit 910. The user interface 911 includes a button and a switch for a user to operate the television device 900 as well as a reception part which receives a remote control signal, for example. The user interface 911 detects a user operation through these components, generates the operation signal, and outputs the generated operation signal to the control unit 910.

The bus 912 mutually connects the tuner 902, the demultiplexer 903, the decoder 904, the video signal processing unit 905, the audio signal processing unit 907, the external interface 909, and the control unit 910.

The decoder 904 in the television device 900 configured in the aforementioned manner has a function of the image decoding device 60 according to the aforementioned embodiment. Thus, when the television device 900 performs the color gamut prediction on the layers of which the color gamuts are mutually different, the buffer size for a lookup table can be reduced.

(2) Second Application Example

Figure 15:
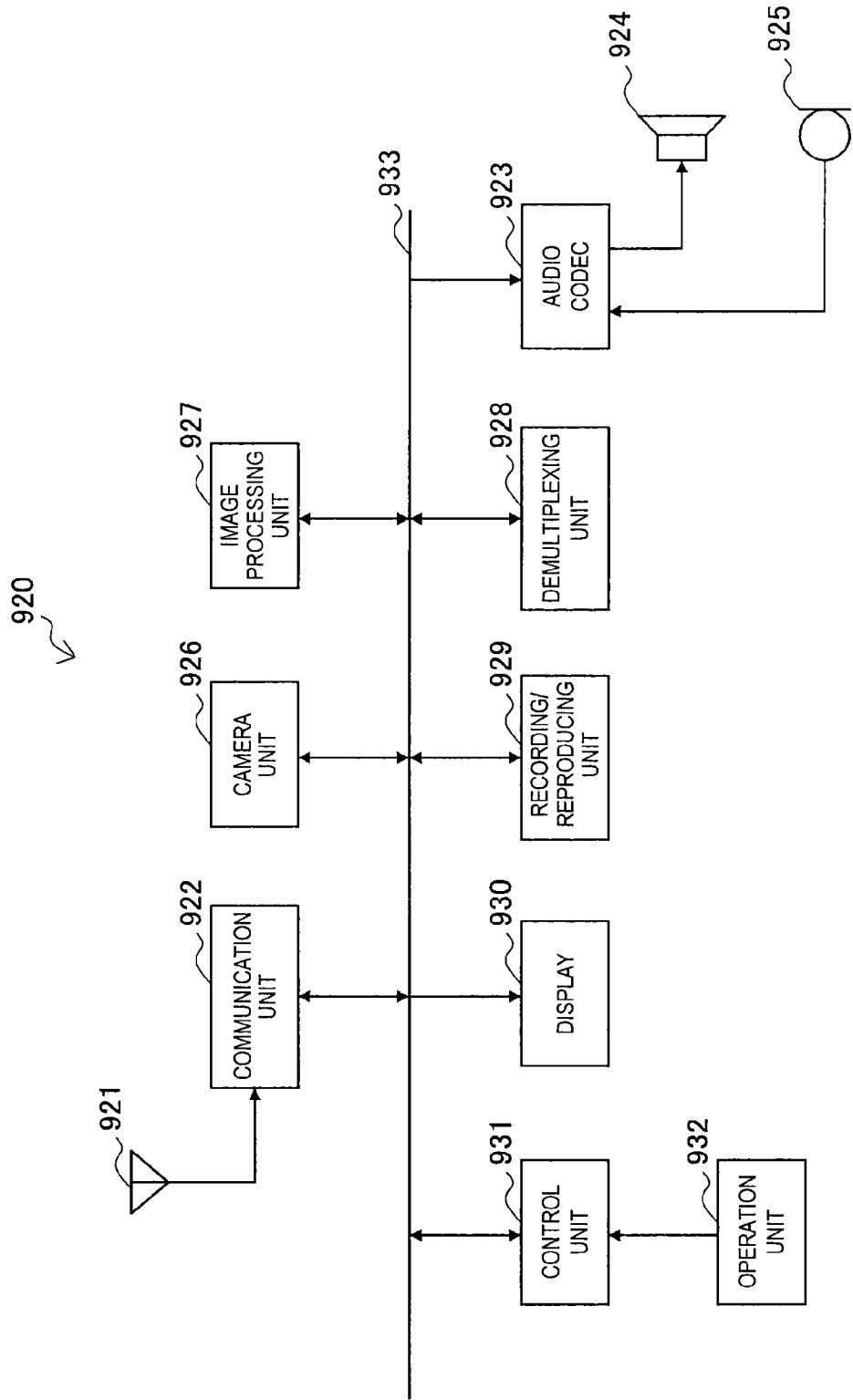
FIG. 15 is a block diagram showing an example of a schematic configuration of a mobile phone.

FIG. 15 is a diagram illustrating an example of a schematic configuration of a mobile telephone applying the aforementioned embodiment. A mobile telephone 920 includes an antenna 921, a communication unit 922, an audio codec 923, a speaker 924, a microphone 925, a camera unit 926, an image processing unit 927, a demultiplexing unit 928, a recording/reproducing unit 929, a display 930, a control unit 931, an operation unit 932, and a bus 933.

The antenna 921 is connected to the communication unit 922. The speaker 924 and the microphone 925 are connected to the audio codec 923. The operation unit 932 is connected to the control unit 931. The bus 933 mutually connects the communication unit 922, the audio codec 923, the camera unit 926, the image processing unit 927, the demultiplexing unit 928, the recording/reproducing unit 929, the display 930, and the control unit 931.

The mobile telephone 920 performs an operation such as transmitting/receiving an audio signal, transmitting/receiving an electronic mail or image data, imaging an image, or recording data in various operation modes including an audio call mode, a data communication mode, a photography mode, and a videophone mode.

In the audio call mode, an analog audio signal generated by the microphone 925 is supplied to the audio codec 923. The audio codec 923 then converts the analog audio signal into audio data, performs A/D conversion on the converted audio data, and compresses the data. The audio codec 923 thereafter outputs the compressed audio data to the communication unit 922. The communication unit 922 encodes and modulates the audio data to generate a transmission signal. The communication unit 922 then transmits the generated transmission signal to a base station (not shown) through the antenna 921. Furthermore, the communication unit 922 amplifies a radio signal received through the antenna 921, converts a frequency of the signal, and acquires a reception signal. The communication unit 922 thereafter demodulates and decodes the reception signal to generate the audio data and output the generated audio data to the audio codec 923. The audio codec 923 expands the audio data, performs D/A conversion on the data, and generates the analog audio signal. The audio codec 923 then outputs the audio by supplying the generated audio signal to the speaker 924.

In the data communication mode, for example, the control unit 931 generates character data configuring an electronic mail, in accordance with a user operation through the operation unit 932. The control unit 931 further displays a character on the display 930. Moreover, the control unit 931 generates electronic mail data in accordance with a transmission instruction from a user through the operation unit 932 and outputs the generated electronic mail data to the communication unit 922. The communication unit 922 encodes and modulates the electronic mail data to generate a transmission signal. Then, the communication unit 922 transmits the generated transmission signal to the base station (not shown) through the antenna 921. The communication unit 922 further amplifies a radio signal received through the antenna 921, converts a frequency of the signal, and acquires a reception signal. The communication unit 922 thereafter demodulates and decodes the reception signal, restores the electronic mail data, and outputs the restored electronic mail data to the control unit 931. The control unit 931 displays the content of the electronic mail on the display 930 as well as stores the electronic mail data in a storage medium of the recording/reproducing unit 929.

The recording/reproducing unit 929 includes an arbitrary storage medium that is readable and writable. For example, the storage medium may be a built-in storage medium such as a RAM or a flash memory, or may be an externally-mounted storage medium such as a hard disk, a magnetic disk, a magneto-optical disk, an optical disk, a USB (Unallocated Space Bitmap) memory, or a memory card.

In the photography mode, for example, the camera unit 926 images an object, generates image data, and outputs the generated image data to the image processing unit 927. The image processing unit 927 encodes the image data input from the camera unit 926 and stores an encoded stream in the storage medium of the recording/reproducing unit 929.

In the videophone mode, for example, the demultiplexing unit 928 multiplexes a video stream encoded by the image processing unit 927 and an audio stream input from the audio codec 923, and outputs the multiplexed stream to the communication unit 922. The communication unit 922 encodes and modulates the stream to generate a transmission signal. The communication unit 922 subsequently transmits the generated transmission signal to the base station (not shown) through the antenna 921. Moreover, the communication unit 922 amplifies a radio signal received through the antenna 921, converts a frequency of the signal, and acquires a reception signal. The transmission signal and the reception signal can include an encoded bit stream. Then, the communication unit 922 demodulates and decodes the reception signal to restore the stream, and outputs the restored stream to the demultiplexing unit 928. The demultiplexing unit 928 isolates the video stream and the audio stream from the input stream and outputs the video stream and the audio stream to the image processing unit 927 and the audio codec 923, respectively. The image processing unit 927 decodes the video stream to generate video data. The video data is then supplied to the display 930, which displays a series of images. The audio codec 923 expands and performs D/A conversion on the audio stream to generate an analog audio signal. The audio codec 923 then supplies the generated audio signal to the speaker 924 to output the audio.

The image processing unit 927 in the mobile telephone 920 configured in the aforementioned manner has a function of the image encoding device 10 and the image decoding device 60 according to the aforementioned embodiment. Thus, when the mobile telephone 920 performs the color gamut prediction on the layers of which the color gamuts are mutually different, the buffer size for a lookup table can be reduced.

(3) Third Application Example

Figure 16:
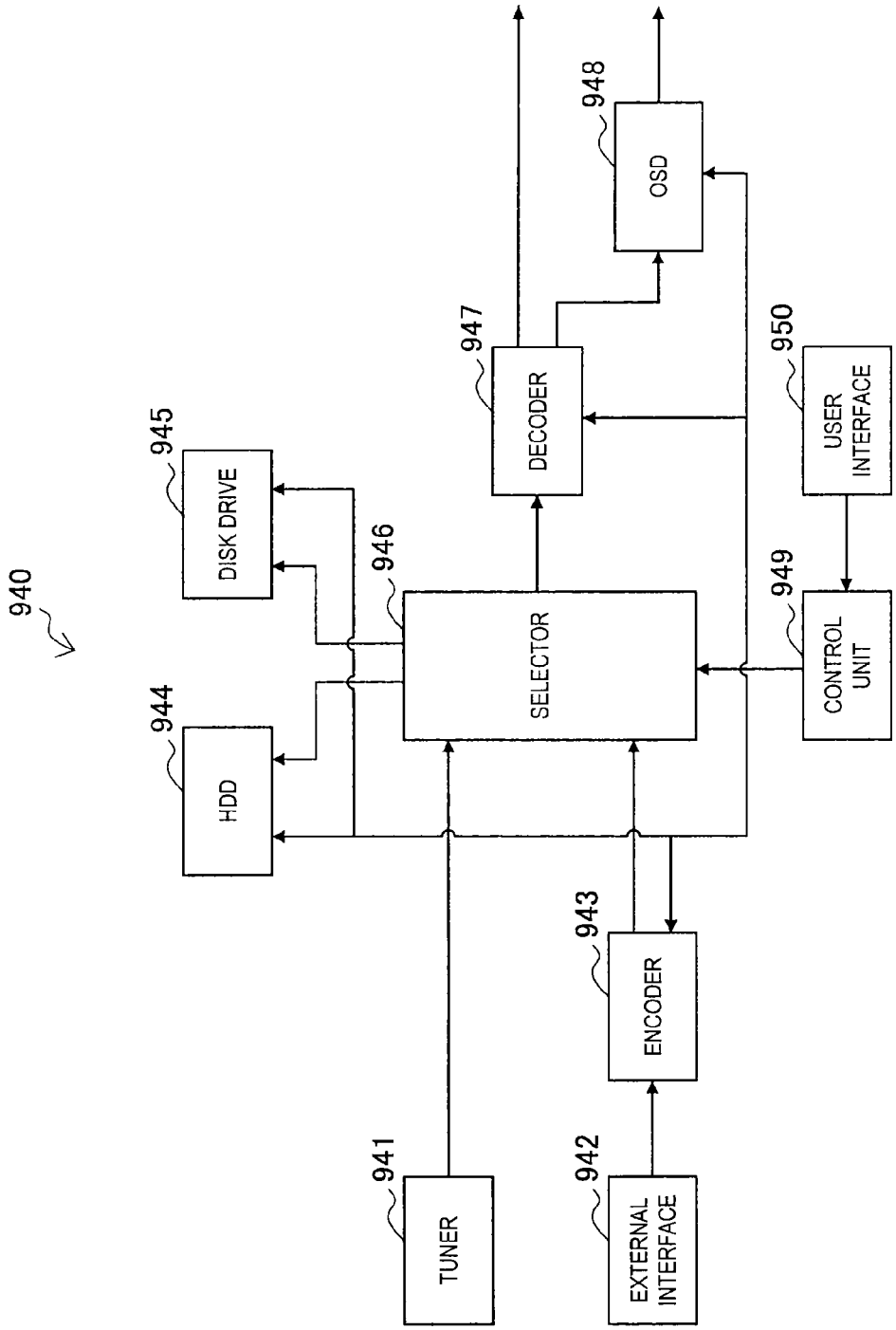
FIG. 16 is a block diagram showing an example of a schematic configuration of a recording/reproduction device.

FIG. 16 is a diagram illustrating an example of a schematic configuration of a recording/reproducing device applying the aforementioned embodiment. A recording/reproducing device 940 encodes audio data and video data of a broadcast program received and records the data into a recording medium, for example. The recording/reproducing device 940 may also encode audio data and video data acquired from another device and record the data into the recording medium, for example. In response to a user instruction, for example, the recording/reproducing device 940 reproduces the data recorded in the recording medium on a monitor and a speaker. The recording/reproducing device 940 at this time decodes the audio data and the video data.

The recording/reproducing device 940 includes a tuner 941, an external interface 942, an encoder 943, an HDD (Hard Disk Drive) 944, a disk drive 945, a selector 946, a decoder 947, an OSD (On-Screen Display) 948, a control unit 949, and a user interface 950.

The tuner 941 extracts a signal of a desired channel from a broadcast signal received through an antenna (not shown) and demodulates the extracted signal. The tuner 941 then outputs an encoded bit stream obtained by the demodulation to the selector 946. That is, the tuner 941 has a role as transmission means in the recording/reproducing device 940.

The external interface 942 is an interface which connects the recording/reproducing device 940 with an external device or a network. The external interface 942 may be, for example, an IEEE 1394 interface, a network interface, a USB interface, or a flash memory interface. The video data and the audio data received through the external interface 942 are input to the encoder 943, for example. That is, the external interface 942 has a role as transmission means in the recording/reproducing device 940.

The encoder 943 encodes the video data and the audio data when the video data and the audio data input from the external interface 942 are not encoded. The encoder 943 thereafter outputs an encoded bit stream to the selector 946.

The HDD 944 records, into an internal hard disk, the encoded bit stream in which content data such as video and audio is compressed, various programs, and other data. The HDD 944 reads these data from the hard disk when reproducing the video and the audio.

The disk drive 945 records and reads data into/from a recording medium which is mounted to the disk drive. The recording medium mounted to the disk drive 945 may be, for example, a DVD disk (such as DVD-Video, DVD-RAM, DVD-R, DVD-RW, DVD+R, or DVD+RW) or a Blu-ray (Registered Trademark) disk.

The selector 946 selects the encoded bit stream input from the tuner 941 or the encoder 943 when recording the video and audio, and outputs the selected encoded bit stream to the HDD 944 or the disk drive 945. When reproducing the video and audio, on the other hand, the selector 946 outputs the encoded bit stream input from the HDD 944 or the disk drive 945 to the decoder 947.

The decoder 947 decodes the encoded bit stream to generate the video data and the audio data. The decoder 904 then outputs the generated video data to the OSD 948 and the generated audio data to an external speaker.

The OSD 948 reproduces the video data input from the decoder 947 and displays the video. The OSD 948 may also superpose an image of a GUI such as a menu, a button, or a cursor onto the video displayed.

The control unit 949 includes a processor such as a CPU and a memory such as a RAM and a ROM. The memory stores a program executed by the CPU as well as program data. The program stored in the memory is read by the CPU at the start-up of the recording/reproducing device 940 and executed, for example. By executing the program, the CPU controls the operation of the recording/reproducing device 940 in accordance with an operation signal that is input from the user interface 950, for example.

The user interface 950 is connected to the control unit 949. The user interface 950 includes a button and a switch for a user to operate the recording/reproducing device 940 as well as a reception part which receives a remote control signal, for example. The user interface 950 detects a user operation through these components, generates the operation signal, and outputs the generated operation signal to the control unit 949.

The encoder 943 in the recording/reproducing device 940 configured in the aforementioned manner has a function of the image encoding device 10 according to the aforementioned embodiment. On the other hand, the decoder 947 has a function of the image decoding device 60 according to the aforementioned embodiment. Thus, when the recording/reproducing device 940 performs the color gamut prediction on the layers of which the color gamuts are mutually different, the buffer size for a lookup table can be reduced.

(4) Fourth Application Example

Figure 17:
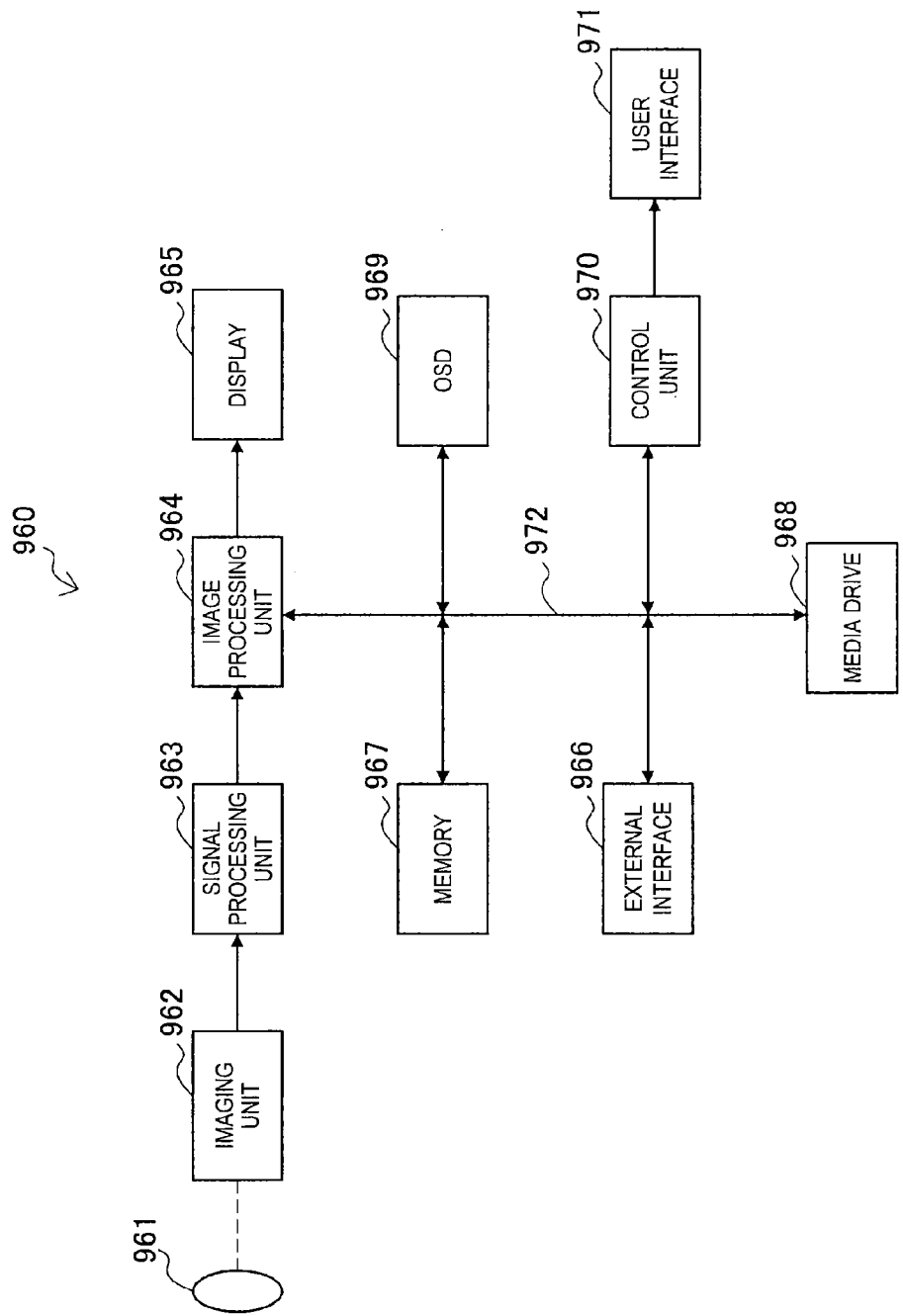
FIG. 17 is a block diagram showing an example of a schematic configuration of an image capturing device.

FIG. 17 shows an example of a schematic configuration of an image capturing device applying the aforementioned embodiment. An imaging device 960 images an object, generates an image, encodes image data, and records the data into a recording medium.

The imaging device 960 includes an optical block 961, an imaging unit 962, a signal processing unit 963, an image processing unit 964, a display 965, an external interface 966, a memory 967, a media drive 968, an OSD 969, a control unit 970, a user interface 971, and a bus 972.

The optical block 961 is connected to the imaging unit 962. The imaging unit 962 is connected to the signal processing unit 963. The display 965 is connected to the image processing unit 964. The user interface 971 is connected to the control unit 970. The bus 972 mutually connects the image processing unit 964, the external interface 966, the memory 967, the media drive 968, the OSD 969, and the control unit 970.

The optical block 961 includes a focus lens and a diaphragm mechanism. The optical block 961 forms an optical image of the object on an imaging surface of the imaging unit 962. The imaging unit 962 includes an image sensor such as a CCD (Charge Coupled Device) or a CMOS (Complementary Metal Oxide Semiconductor) and performs photoelectric conversion to convert the optical image formed on the imaging surface into an image signal as an electric signal. Subsequently, the imaging unit 962 outputs the image signal to the signal processing unit 963.

The signal processing unit 963 performs various camera signal processes such as a knee correction, a gamma correction and a color correction on the image signal input from the imaging unit 962. The signal processing unit 963 outputs the image data, on which the camera signal process has been performed, to the image processing unit 964.

The image processing unit 964 encodes the image data input from the signal processing unit 963 and generates the encoded data. The image processing unit 964 then outputs the generated encoded data to the external interface 966 or the media drive 968. The image processing unit 964 also decodes the encoded data input from the external interface 966 or the media drive 968 to generate image data. The image processing unit 964 then outputs the generated image data to the display 965. Moreover, the image processing unit 964 may output to the display 965 the image data input from the signal processing unit 963 to display the image. Furthermore, the image processing unit 964 may superpose display data acquired from the OSD 969 onto the image that is output on the display 965.

The OSD 969 generates an image of a GUI such as a menu, a button, or a cursor and outputs the generated image to the image processing unit 964.

The external interface 966 is configured as a USB input/output terminal, for example. The external interface 966 connects the imaging device 960 with a printer when printing an image, for example. Moreover, a drive is connected to the external interface 966 as needed. A removable medium such as a magnetic disk or an optical disk is mounted to the drive, for example, so that a program read from the removable medium can be installed to the imaging device 960. The external interface 966 may also be configured as a network interface that is connected to a network such as a LAN or the Internet. That is, the external interface 966 has a role as transmission means in the imaging device 960.

The recording medium mounted to the media drive 968 may be an arbitrary removable medium that is readable and writable such as a magnetic disk, a magneto-optical disk, an optical disk, or a semiconductor memory. Furthermore, the recording medium may be fixedly mounted to the media drive 968 so that a non-transportable storage unit such as a built-in hard disk drive or an SSD (Solid State Drive) is configured, for example.

The control unit 970 includes a processor such as a CPU and a memory such as a RAM and a ROM. The memory stores a program executed by the CPU as well as program data. The program stored in the memory is read by the CPU at the start-up of the imaging device 960 and then executed. By executing the program, the CPU controls the operation of the imaging device 960 in accordance with an operation signal that is input from the user interface 971, for example.

The user interface 971 is connected to the control unit 970. The user interface 971 includes a button and a switch for a user to operate the imaging device 960, for example. The user interface 971 detects a user operation through these components, generates the operation signal, and outputs the generated operation signal to the control unit 970.

The image processing unit 964 in the imaging device 960 configured in the aforementioned manner has a function of the image encoding device 10 and the image decoding device 60 according to the aforementioned embodiment. Thus, when the imaging device 960 performs the color gamut prediction on the layers of which the color gamuts are mutually different, the buffer size for a lookup table can be reduced.

7-2. Various Uses of Scalable Video Coding

Advantages of scalable video coding described above can be enjoyed in various uses. Three examples of use will be described below.

(1) First Example

Figure 18:
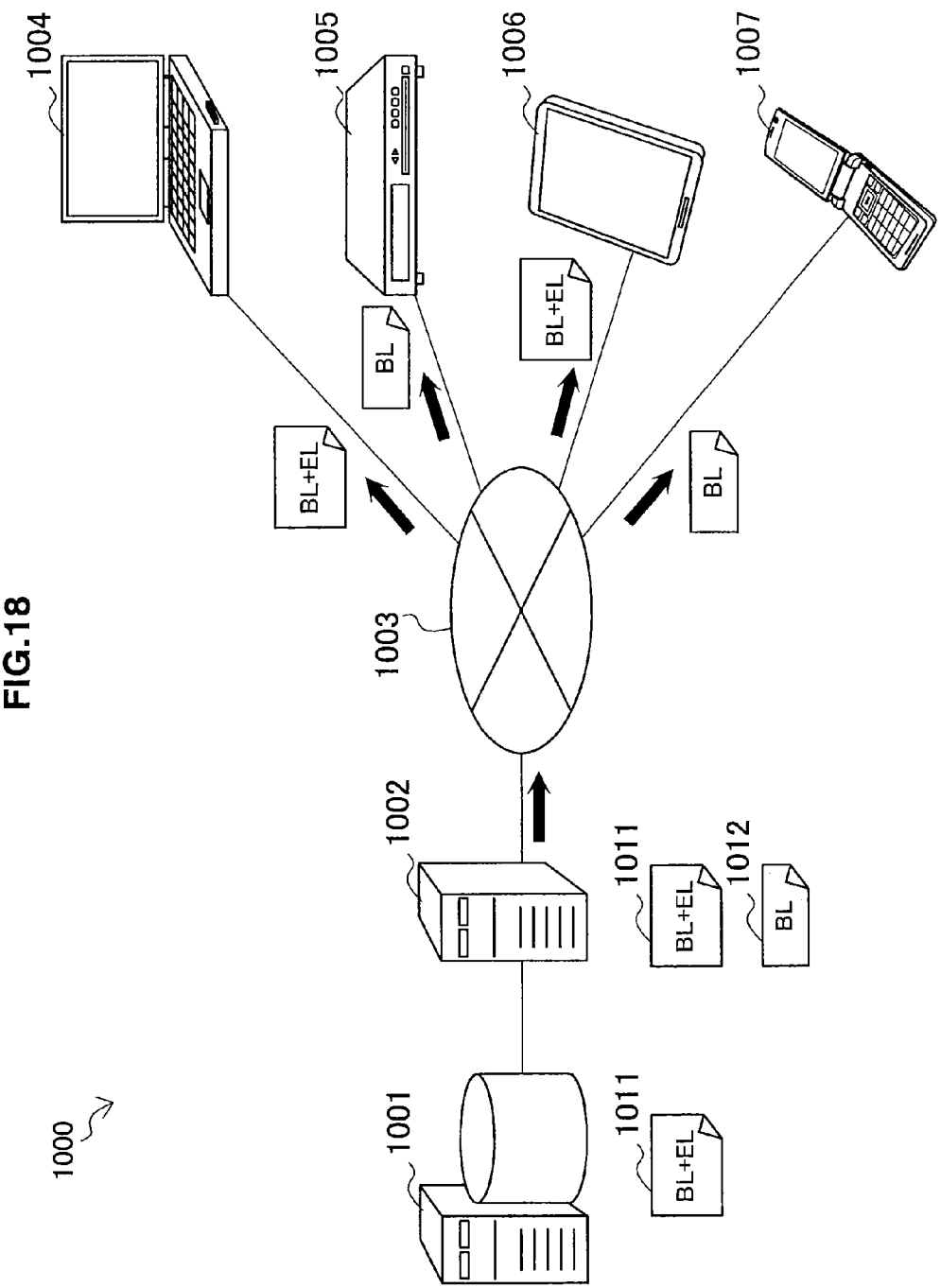
FIG. 18 is an explanatory view illustrating a first example of use of the scalable video coding.

In the first example, scalable video coding is used for selective transmission of data. Referring to FIG. 18, a data transmission system 1000 includes a stream storage device 1001 and a delivery server 1002. The delivery server 1002 is connected to some terminal devices via a network 1003. The network 1003 may be a wire network or a wireless network or a combination thereof. FIG. 18 shows a PC (Personal Computer) 1004, an AV device 1005, a tablet device 1006, and a mobile phone 1007 as examples of the terminal devices.

The stream storage device 1001 stores, for example, stream data 1011 including a multiplexed stream generated by the image encoding device 10. The multiplexed stream includes an encoded stream of the base layer (BL) and an encoded stream of an enhancement layer (EL). The delivery server 1002 reads the stream data 1011 stored in the stream storage device 1001 and delivers at least a portion of the read stream data 1011 to the PC 1004, the AV device 1005, the tablet device 1006, and the mobile phone 1007 via the network 1003.

When a stream is delivered to a terminal device, the delivery server 1002 selects the stream to be delivered based on some condition such as capabilities of a terminal device or the communication environment. For example, the delivery server 1002 may avoid a delay in a terminal device or an occurrence of overflow or overload of a processor by not delivering an encoded stream having high image quality exceeding image quality that can be handled by the terminal device. The delivery server 1002 may also avoid occupation of communication bands of the network 1003 by not delivering an encoded stream having high image quality. On the other hand, when there is no risk to be avoided or it is considered to be appropriate based on a user's contract or some condition, the delivery server 1002 may deliver an entire multiplexed stream to a terminal device.

In the example of FIG. 18, the delivery server 1002 reads the stream data 1011 from the stream storage device 1001. Then, the delivery server 1002 delivers the stream data 1011 directly to the PC 1004 having high processing capabilities. Because the AV device 1005 has low processing capabilities, the delivery server 1002 generates stream data 1012 containing only an encoded stream of the base layer extracted from the stream data 1011 and delivers the stream data 1012 to the AV device 1005. The delivery server 1002 delivers the stream data 1011 directly to the tablet device 1006 capable of communication at a high communication rate. Because the mobile phone 1007 can communicate at a low communication rate, the delivery server 1002 delivers the stream data 1012 containing only an encoded stream of the base layer to the mobile phone 1007.

By using the multiplexed stream in this manner, the amount of traffic to be transmitted can adaptively be adjusted. The code amount of the stream data 1011 is reduced when compared with a case when each layer is individually encoded and thus, even if the whole stream data 1011 is delivered, the load on the network 1003 can be lessened. Further, memory resources of the stream storage device 1001 are saved.

Hardware performance of the terminal devices is different from device to device. In addition, capabilities of applications run on the terminal devices are diverse. Further, communication capacities of the network 1003 are varied. Capacities available for data transmission may change every moment due to other traffic. Thus, before starting delivery of stream data, the delivery server 1002 may acquire terminal information about hardware performance and application capabilities of terminal devices and network information about communication capacities of the network 1003 through signaling with the delivery destination terminal device. Then, the delivery server 1002 can select the stream to be delivered based on the acquired information.

Incidentally, the layer to be decoded may be extracted by the terminal device. For example, the PC 1004 may display a base layer image extracted and decoded from a received multiplexed stream on the screen thereof. After generating the stream data 1012 by extracting an encoded stream of the base layer from a received multiplexed stream, the PC 1004 may cause a storage medium to store the stream data 1012 or transfer the stream data to another device.

The configuration of the data transmission system 1000 shown in FIG. 18 is only an example. The data transmission system 1000 may include any numbers of the stream storage device 1001, the delivery server 1002, the network 1003, and terminal devices.

(2) Second Example

Figure 19:
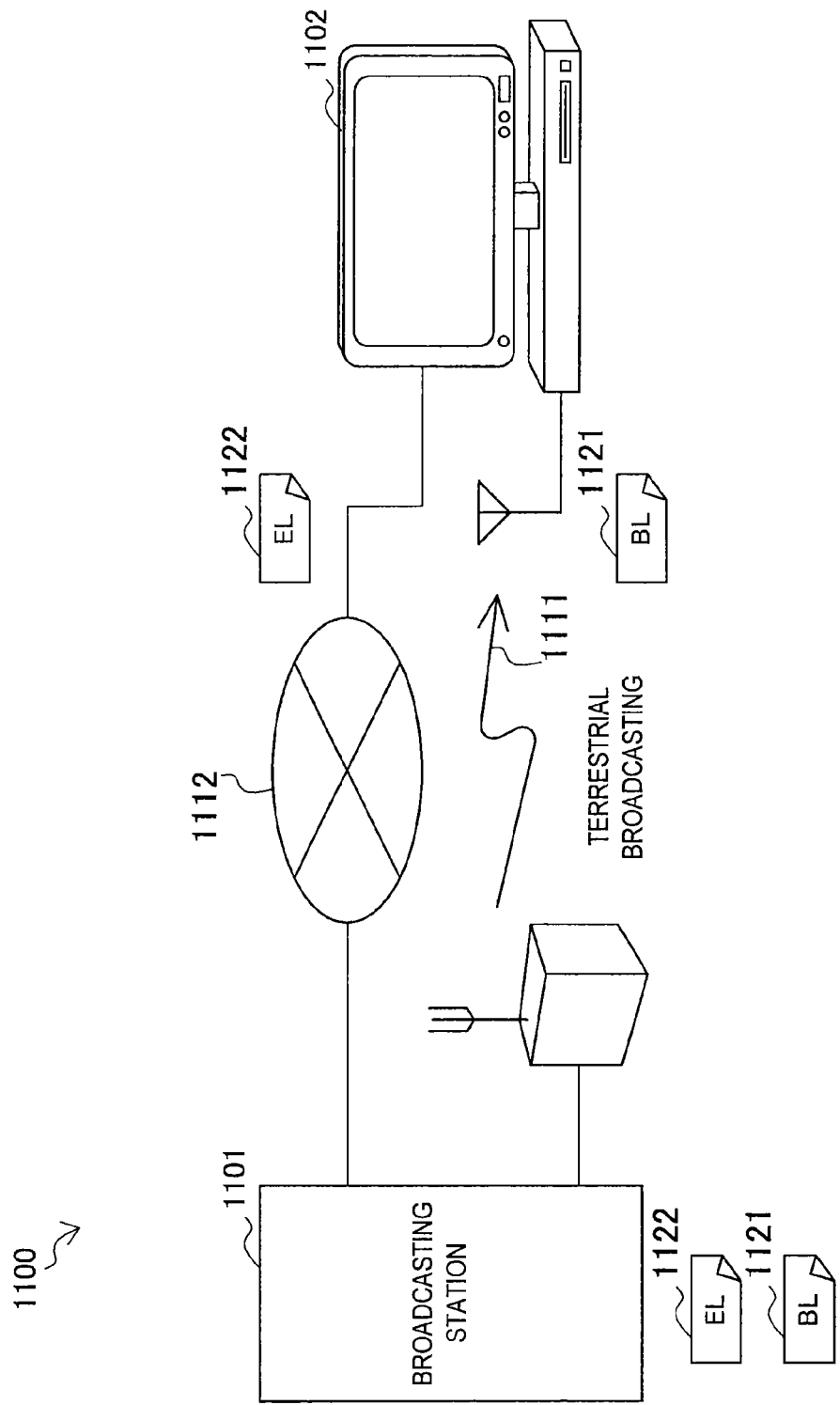
FIG. 19 is an explanatory view illustrating a second example of use of the scalable video coding.

In the second example, scalable video coding is used for transmission of data via a plurality of communication channels. Referring to FIG. 19, a data transmission system 1100 includes a broadcasting station 1101 and a terminal device 1102. The broadcasting station 1101 broadcasts an encoded stream 1121 of the base layer on a terrestrial channel 1111. The broadcasting station 1101 also broadcasts an encoded stream 1122 of an enhancement layer to the terminal device 1102 via a network 1112.

The terminal device 1102 has a receiving function to receive terrestrial broadcasting broadcast by the broadcasting station 1101 and receives the encoded stream 1121 of the base layer via the terrestrial channel 1111. The terminal device 1102 also has a communication function to communicate with the broadcasting station 1101 and receives the encoded stream 1122 of an enhancement layer via the network 1112.

After receiving the encoded stream 1121 of the base layer, for example, in response to user's instructions, the terminal device 1102 may decode a base layer image from the received encoded stream 1121 and display the base layer image on the screen. Alternatively, the terminal device 1102 may cause a storage medium to store the decoded base layer image or transfer the base layer image to another device.

After receiving the encoded stream 1122 of an enhancement layer via the network 1112, for example, in response to user's instructions, the terminal device 1102 may generate a multiplexed stream by multiplexing the encoded stream 1121 of the base layer and the encoded stream 1122 of an enhancement layer. The terminal device 1102 may also decode an enhancement image from the encoded stream 1122 of an enhancement layer to display the enhancement image on the screen. Alternatively, the terminal device 1102 may cause a storage medium to store the decoded enhancement layer image or transfer the enhancement layer image to another device.

As described above, an encoded stream of each layer contained in a multiplexed stream can be transmitted via a different communication channel for each layer. Accordingly, a communication delay or an occurrence of overflow can be reduced by distributing loads on individual channels.

The communication channel to be used for transmission may dynamically be selected in accordance with some condition. For example, the encoded stream 1121 of the base layer whose data amount is relatively large may be transmitted via a communication channel having a wider bandwidth and the encoded stream 1122 of an enhancement layer whose data amount is relatively small may be transmitted via a communication channel having a narrower bandwidth. The communication channel on which the encoded stream 1122 of a specific layer is transmitted may be switched in accordance with the bandwidth of the communication channel. Accordingly, the load on individual channels can be lessened more effectively.

The configuration of the data transmission system 1100 shown in FIG. 19 is only an example. The data transmission system 1100 may include any numbers of communication channels and terminal devices. The configuration of the system described here may also be applied to other uses than broadcasting.

(3) Third Example

In the third example, scalable video coding is used for storage of video. Referring to FIG. 20, a data transmission system 1200 includes an imaging device 1201 and a stream storage device 1202. The imaging device 1201 scalable-encodes image data generated by a subject 1211 being imaged to generate a multiplexed stream 1221. The multiplexed stream 1221 includes an encoded stream of the base layer and an encoded stream of an enhancement layer. Then, the imaging device 1201 supplies the multiplexed stream 1221 to the stream storage device 1202.

The stream storage device 1202 stores the multiplexed stream 1221 supplied from the imaging device 1201 in different image quality for each mode. For example, the stream storage device 1202 extracts the encoded stream 1222 of the base layer from the multiplexed stream 1221 in normal mode and stores the extracted encoded stream 1222 of the base layer. In high quality mode, by contrast, the stream storage device 1202 stores the multiplexed stream 1221 as it is. Accordingly, the stream storage device 1202 can store a high-quality stream with a large amount of data only when recording of video in high quality is desired. Therefore, memory resources can be saved while the influence of image degradation on users is curbed.

For example, the imaging device 1201 is assumed to be a surveillance camera. When no surveillance object (for example, no intruder) appears in a captured image, the normal mode is selected. In this case, the captured image is likely to be unimportant and priority is given to the reduction of the amount of data so that the video is recorded in low image quality (that is, only the encoded stream 1222 of the base layer is stored). In contract, when a surveillance object (for example, the subject 1211 as an intruder) appears in a captured image, the high-quality mode is selected. In this case, the captured image is likely to be important and priority is given to high image quality so that the video is recorded in high image quality (that is, the multiplexed stream 1221 is stored).

In the example of FIG. 20, the mode is selected by the stream storage device 1202 based on, for example, an image analysis result. However, the present embodiment is not limited to such an example and the imaging device 1201 may select the mode. In the latter case, imaging device 1201 may supply the encoded stream 1222 of the base layer to the stream storage device 1202 in normal mode and the multiplexed stream 1221 to the stream storage device 1202 in high-quality mode.

Selection criteria for selecting the mode may be any criteria. For example, the mode may be switched in accordance with the loudness of voice acquired through a microphone or the waveform of voice. The mode may also be switched periodically. Also, the mode may be switched in response to user's instructions. Further, the number of selectable modes may be any number as long as the number of hierarchized layers is not exceeded.

The configuration of the data transmission system 1200 shown in FIG. 20 is only an example. The data transmission system 1200 may include any number of the imaging device 1201. The configuration of the system described here may also be applied to other uses than the surveillance camera.

7-3. Others (1) Application to the Multi-View Codec

The multi-view codec is a kind of multi-layer codec and is an image encoding system to encode and decode so-called multi-view video. FIG. 21 is an explanatory view illustrating a multi-view codec. Referring to FIG. 21, sequences of three view frames captured from three viewpoints are shown. A view ID (view_id) is attached to each view. Among a plurality of these views, one view is specified as the base view. Views other than the base view are called non-base views. In the example of FIG. 21, the view whose view ID is "0" is the base view and two views whose view ID is "1" or "2" are non-base views. When these views are hierarchically encoded, each view may correspond to a layer. As indicated by arrows in FIG. 21, an image of a non-base view is encoded and decoded by referring to an image of the base view (an image of the other non-base view may also be referred to).

FIG. 22 is a block diagram showing a schematic configuration of an image encoding device 10v supporting the multi-view codec. Referring to FIG. 22, the image encoding device 10v includes a first layer encoding section 1c, a second layer encoding section 1d, the common memory 2, and the multiplexing section 3.

The function of the first layer encoding section 1c is the same as that of the BL encoding section 1a described using FIG. 3 except that, instead of a base layer image, a base view image is received as input. The first layer encoding section 1c encodes the base view image to generate an encoded stream of a first layer. The function of the second layer encoding section 1d is the same as that of the EL encoding section 1b described using FIG. 3 except that, instead of an enhancement layer image, a non-base view image is received as input. The second layer encoding section 1d encodes the non-base view image to generate an encoded stream of a second layer. The common memory 2 stores information commonly used between layers. The multiplexing section 3 multiplexes an encoded stream of the first layer generated by the first layer encoding section 1c and an encoded stream of the second layer generated by the second layer encoding section 1d to generate a multilayer multiplexed stream.

FIG. 23 is a block diagram showing a schematic configuration of an image decoding device 60v supporting the multi-view codec. Referring to FIG. 23, the image decoding device 60v includes the demultiplexing section 5, a first layer decoding section 6c, a second layer decoding section 6d, and the common memory 7.

The demultiplexing section 5 demultiplexes a multilayer multiplexed stream into an encoded stream of the first layer and an encoded stream of the second layer. The function of the first layer decoding section 6c is the same as that of the BL decoding section 6a described using FIG. 4 except that an encoded stream in which, instead of a base layer image, a base view image is encoded is received as input. The first layer decoding section 6c decodes a base view image from an encoded stream of the first layer. The function of the second layer decoding section 6d is the same as that of the EL decoding section 6b described using FIG. 4 except that an encoded stream in which, instead of an enhancement layer image, a non-base view image is encoded is received as input. The second layer decoding section 6d decodes a non-base view image from an encoded stream of the second layer. The common memory 7 stores information commonly used between layers.

When multi-view image data is encoded or decoded and a color gamut is different between views, conversion of the color gamut between the views may be controlled according to the technology in the present disclosure. Thus, as in the case of the scalable video coding, the buffer size for a lookup table can be reduced in the multi-view codec.

(2) Application to Streaming Technology

Technology in the present disclosure may also be applied to a streaming protocol. In MPEG-DASH (Dynamic Adaptive Streaming over HTTP), for example, a plurality of encoded streams having mutually different parameters such as the resolution is prepared by a stream server in advance. Then, the streaming server dynamically selects appropriate data for streaming from the plurality of encoded streams and delivers the selected data. In such a streaming protocol, the prediction of the color gamut between the encoded streams may be controlled according to the technology in the present disclosure.

7. CONCLUSION

The embodiments of the technology in the present disclosure have been described in detail above with reference to FIGS. 1 to 23. In the above-described embodiments, the lookup table in which the granularities of the first and second color difference components are rougher than the granularity of the luminance component is used when the image of the second layer having the different color gamut (or dynamic range) from the first layer is predicted from the image of the first layer using the lookup table which maps combinations of the luminance component, the first color difference component, and the second color difference component of the first layer to the predicted pixel values of the second layer corresponding to the combinations. Accordingly, the size of the buffer buffering the lookup table can be reduced compared to when the lookup table in which the granularities of the three color components are mutually the same is used. In many uses, by setting the image resolutions of the color difference components to be lower than the image resolution of the luminance component and allowing only the granularities of the color difference components to be rougher while maintaining the fine granularity of the luminance component, it is possible to lessen the influence of the deterioration in the prediction precision caused due to the reduction in the granularities.

In the above-described embodiments, the lookup table information relevant to the granularities of the first and second color difference components of the lookup table is encoded and decoded separately from the granularity of the luminance component. In this configuration, the resolution is different for each color component and the degree of reduction in the buffer size can be flexibly adjusted in accordance with various conditions such as the requisites regarding the encoding efficiency or restrictions of the memory resources.

The terms "CU," "PU," and "TU" described in the present specification refer to logical units including a syntax associated with an individual block in HEVC. When only individual blocks which are parts of an image are focused on, the blocks may be referred to with the terms "coding block (CB)," "prediction block (PB)," and "transform block (TB)." A CB is formed by hierarchically dividing a coding tree block (CTB) in a quad-tree shape. The one entire quad-tree corresponds to the CTB and a logical unit corresponding to the CTB is referred to as a coding tree unit (CTU). The CTB and the CB in HEVC have a similar role to a macro block in H.264/AVC in that the CTB and the CB are processing units of an encoding process. However, the CTB and the CB are different from the macro block in that the sizes of the CTB and the CB are not fixed (the size of the macro block is normally 16×16 pixels). The size of the CTB is selected from a size of 16×16 pixels, a size of 32×32 pixels, and a size of 64×64 pixels and is designated by a parameter in an encoded stream. The size of the CB can be changed according to a division depth of the CTB.

Mainly described herein is the example where the various pieces of information such as the information related to color gamut prediction (or DR prediction) are multiplexed to the header of the encoded stream and transmitted from the encoding side to the decoding side. The method of transmitting these pieces of information however is not limited to such example. For example, these pieces of information may be transmitted or recorded as separate data associated with the encoded bit stream without being multiplexed to the encoded bit stream. Here, the term "association" means to allow the image included in the bit stream (may be a part of the image such as a slice or a block) and the information corresponding to the current image to establish a link when decoding. Namely, the information may be transmitted on a different transmission path from the image (or the bit stream). The information may also be recorded in a different recording medium (or a different recording area in the same recording medium) from the image (or the bit stream). Furthermore, the information and the image (or the bit stream) may be associated with each other by an arbitrary unit such as a plurality of frames, one frame, or a portion within a frame.

The preferred embodiments of the present disclosure have been described above with reference to the accompanying drawings, whilst the present disclosure is not limited to the above examples, of course. A person skilled in the art may find various alternations and modifications within the scope of the appended claims, and it should be understood that they will naturally come under the technical scope of the present disclosure.

Additionally, the present technology may also be configured as below.

(1) An image processing apparatus including:
circuitry configured to
predict an image of a second layer from an image of a first layer using a lookup table which maps combinations of a luminance component, a first color difference component, and a second color difference component of the first layer to predicted pixel values of the second layer corresponding to the combinations, the second layer having a different color gamut from the first layer,
wherein the circuitry uses the lookup table in which granularities of the first and second color difference components are lower than a granularity of the luminance component.

(2) The image processing apparatus according to (1), wherein the circuitry is further configured to:
decode lookup table information regarding the granularities of the first and second color difference components of the lookup table.

(3) The image processing apparatus according to (2), further including:
a lookup table buffer configured to buffer the lookup table set based on the lookup table information decoded by the circuitry.

(4) The image processing apparatus according to any one of (1) to (3), wherein the circuitry uses the lookup table in which the granularities of the first and second color difference components are lower than the granularity of the luminance component when a chroma format indicates that resolutions of the first and second color difference components are lower than a resolution of the luminance component.

(5) An image processing method including:
predicting, by circuitry of an image processing apparatus, an image of a second layer from an image of a first layer using a lookup table which maps combinations of a luminance component, a first color difference component, and a second color difference component of the first layer to predicted pixel values of the second layer corresponding to the combinations, the second layer having a different color gamut from the first layer,
wherein the predicting of the image of the second layer is performed by the circuitry using the lookup table in which granularities of the first and second color difference components are lower than a granularity of the luminance component.

(6) The image processing method according to (5), further including:
decoding lookup table information regarding the granularities of the first and second color difference components of the lookup table.

(7) The image processing method according to (6), further including:
buffering the lookup table set based on the lookup table information decoded by the circuitry.

(8) The image processing method according to any one of (5) to (7), wherein the predicting of the image of the second layer is performed using the lookup table in which the granularities of the first and second color difference components are lower than the granularity of the luminance component when a chroma format indicates that resolutions of the first and second color difference components are lower than a resolution of the luminance component.

(9) A non-transitory computer-readable medium having stored thereon:
encoded image data of a first layer;
encoded image data of a second layer; and
a lookup table which maps combinations of a luminance component, a first color difference component, and a second color difference component of the first layer to predicted pixel values of the second layer corresponding to the combinations, the second layer having a different color gamut from the first layer, wherein
a decoder predicts an image of the second layer from an image of the first layer using the lookup table, and
in the lookup table, granularities of the first and second color difference components are lower than a granularity of the luminance component.

(10). The non-transitory computer-readable medium according to (9), having further stored thereon:
lookup table information regarding the granularities of the first and second color difference components of the lookup table.

(11) The non-transitory computer-readable medium according to (9) or (10), wherein in the lookup table, granularities of the first and second color difference components are lower than a granularity of the luminance component when a chroma format indicates that resolutions of the first and second color difference components are lower than a resolution of the luminance component.

(12) An encoder including:
circuitry configured to
encode an image of a first layer,
encode an image of a second layer, and
generate a lookup table which maps combinations of a luminance component, a first color difference component, and a second color difference component of the first layer to predicted pixel values of the second layer corresponding to the combinations, the second layer having a different color gamut from the first layer, wherein
in the lookup table, granularities of the first and second color difference components are lower than a granularity of the luminance component.

(13) The encoder according to (12), wherein the circuitry is further configured to:
encode lookup table information regarding the granularities of the first and second color difference components of the lookup table.

(14) The encoder according to (12), wherein an image of the second layer is predicted using the lookup table in which the granularities of the first and second color difference components are lower than the granularity of the luminance component when a chroma format indicates that resolutions of the first and second color difference components are lower than a resolution of the luminance component.

Additionally, the present technology may also be configured as below.

(1) An image processing apparatus including:
a prediction section configured to predict an image of a second layer having a different dynamic range from a first layer from an image of the first layer using a lookup table mapping combinations of a luminance component, a first color difference component, and a second color difference component of the first layer to predicted pixel values of the second layer corresponding to the combinations,
wherein the prediction section uses the lookup table in which granularities of the first and second color difference components are rougher than a granularity of the luminance component.

(2) The image processing apparatus according to (1), further including:
a decoding section configured to decode lookup table information regarding the granularities of the first and second color difference components of the lookup table.

(3) The image processing apparatus according to (2), further including:
a lookup table buffer configured to buffer the lookup table set based on the lookup table information decoded by the decoding section.

(4) The image processing apparatus according to (1), further including:
an encoding section configured to encode lookup table information regarding the granularities of the first and second color difference components of the lookup table.

(5) The image processing apparatus according to any one of (1) to (4), wherein the prediction section uses the lookup table in which the granularities of the first and second color difference components are rougher than the granularity of the luminance component when a chroma format indicates that resolutions of the first and second color difference components are lower than a resolution of the luminance component.

(6) An image processing method including:
predicting an image of a second layer having a different dynamic range from a first layer from an image of the first layer using a lookup table mapping each of combinations of a luminance component, a first color difference component, and a second color difference component of the first layer to predicted pixel values of the second layer corresponding to the combination,
wherein the predicting of the image of the second layer is performed using the lookup table in which granularities of the first and second color difference components are rougher than a granularity of the luminance component.

What is claimed is:

1. An image processing apparatus, comprising:
circuitry configured to
perform a color gamut prediction to predict an image of a second layer from an image of a first layer using a first lookup table when a chroma format for the image of the first layer indicates that resolutions of a first color difference component and a second color difference component of the first layer are lower than a resolution of a luminance component of the first layer; and
perform the color gamut prediction to predict the image of the second layer from the image of the first layer using a second lookup table when the chroma format indicates that the resolutions of the first color difference component and the second color difference component of the first layer are equal to the resolution of the luminance component of the first layer, wherein
the first lookup table maps combinations of the luminance component, the first color difference component, and the second color difference component of the first layer to predicted pixel values of the second layer corresponding to the combinations,
the second layer has a different color gamut from the first layer,
information in the first lookup table indicates that granularities of the first and second color difference components are set to be lower than a granularity of the luminance component, and
granularities of the second lookup table are different from granularities of the first lookup table.

2. The image processing apparatus according to claim 1, wherein the circuitry is further configured to:
decode lookup table information regarding the granularities of the first and second color difference components of the first lookup table and the second lookup table.

3. The image processing apparatus according to claim 2, further comprising:
lookup table buffers configured to buffer the first lookup table and the second lookup table set based on the lookup table information decoded by the circuitry.

4. An image processing method, comprising:
performing, by circuitry of an image processing apparatus, a color gamut prediction to predict an image of a second layer from an image of a first layer using a first lookup table when a chroma format for the image of the first layer indicates that resolutions of a first color difference component and a second color difference component of the first layer are lower than a resolution of a luminance component of the first layer;
performing, by the circuitry, the color gamut prediction to predict the image of the second layer from the image of the first layer using a second lookup table when the chroma format indicates that the resolutions of the first color difference component and the second color difference component of the first layer are equal to the resolution of the luminance component of the first layer, wherein
the first lookup table maps combinations of the luminance component, the first color difference component, and the second color difference component of the first layer to predicted pixel values of the second layer corresponding to the combinations,
the second layer has a different color gamut from the first layer,
information in the first lookup table indicates that granularities of the first and second color difference components are set to be lower than a granularity of the luminance component, and
granularities of the second lookup table are different from granularities of the first lookup table.

5. The image processing method according to claim 4, further comprising:
decoding lookup table information regarding the granularities of the first and second color difference components of the first lookup table and the second lookup table.

6. The image processing method according to claim 5, further comprising:
buffering the first lookup table and the second lookup table set based on the lookup table information decoded by the circuitry.

7. A non-transitory computer-readable medium having stored thereon:
encoded image data of a first layer;
encoded image data of a second layer; and
a first lookup table for a color gamut prediction, the first lookup table maps combinations of a luminance component, a first color difference component, and a second color difference component of the first layer to predicted pixel values of the second layer corresponding to the combinations, the second layer having a different color gamut from the first layer, wherein
a decoder performs the color gamut prediction to predict an image of the second layer from an image of the first layer using the first lookup table when a chroma format for the image of the first layer indicates that resolutions of the first color difference component and the second color difference component are lower than a resolution of the luminance component, the decoder performs the color gamut prediction to predict the image of the second layer from the image of the first layer using second lookup table when the chroma format indicates that the resolutions of the first color difference component and the second color difference component are equal to the resolution of the luminance component, information in the first lookup table indicates that granularities of the first and second color difference components are set to be lower than a granularity of the luminance component, and granularities of the second lookup table are different from granularities of the first lookup table.

8. The non-transitory computer-readable medium according to claim 7, having further stored thereon:

lookup table information regarding the granularities of the first and second color difference components of the first lookup table and the second lookup table.

9. An encoder, comprising:

circuitry configured to encode an image of a first layer, encode an image of a second layer, generate a first lookup table for a color gamut prediction, the first lookup table mapping combinations of a luminance component, a first color difference component, and a second color difference component of the first layer to predicted pixel values of the second layer corresponding to the combinations, and the second layer having a different color gamut from the first layer, and generate a second lookup table for the color gamut prediction, wherein the color gamut prediction is performed to predict the image of the second layer from the image of the first layer using the first lookup table when a chroma format for the image of the first layer indicates that resolutions of the first color difference component and the second color difference component are lower than a resolution of the luminance component, the color gamut prediction is performed to predict the image of the second layer from the image of the first layer using the second lookup table when the chroma format indicates that the resolutions of the first color difference component and the second color difference component are equal to the resolution of the luminance component, information in the first lookup table indicates that granularities of the first and second color difference components are set to be lower than a granularity of the luminance component, and granularities of the second lookup table are different from granularities of the first lookup table.

10. The encoder according to claim 9, wherein the circuitry is further configured to:

encode lookup table information regarding the granularities of the first and second color difference components of the first lookup table and the second lookup table.

11. The image processing apparatus according to claim 1, wherein the data size of each of the first difference components and the second color difference components included in the first lookup table is smaller than the data size of the luminance components included in the first lookup table.

12. The image processing method according to claim 4, wherein the data size of each of the first difference components and the second color difference components included in the first lookup table is smaller than the data size of the luminance components included in the first lookup table.

13. The non-transitory computer-readable medium according to claim 7, wherein the data size of each of the first difference components and the second color difference components included in the first lookup table is smaller than the data size of the luminance components included in the first lookup table.

14. The encoder according to claim 9, wherein the data size of each of the first difference components and the second color difference components included in the first lookup table is smaller than the data size of the luminance components included in the first lookup table.

15. The image processing apparatus according to claim 1, wherein information in the second lookup table indicates that a common granularity is to be set for the luminance component, the first color difference component and the second color difference component.

* * * * *